(12) United States Patent
Piehler

(10) Patent No.: US 9,391,695 B2
(45) Date of Patent: Jul. 12, 2016

(54) OPTICAL NETWORK COMMUNICATION SYSTEM WITH EMBEDDED OPTICAL TIME DOMAIN REFLECTOMETER AND METHOD OF OPERATION THEREOF

(71) Applicant: NeoPhotonics Corporation, San Jose, CA (US)

(72) Inventor: David Piehler, Los Gatos, CA (US)

(73) Assignee: NeoPhotonics Corporation, San Jose, CA (US)

( * ) Notice: Subject to any disclaimer, the term of this patent is extended or adjusted under 35 U.S.C. 154(b) by 49 days.

(21) Appl. No.: 14/328,603

(22) Filed: Jul. 10, 2014

(65) Prior Publication Data

US 2015/0016816 A1    Jan. 15, 2015

Related U.S. Application Data

(60) Provisional application No. 61/844,785, filed on Jul. 10, 2013.

(51) Int. Cl.
*H04B 10/00* (2013.01)
*H04B 10/071* (2013.01)

(52) U.S. Cl.
CPC .................. *H04B 10/071* (2013.01)

(58) Field of Classification Search
USPC ........................................ 398/9–38
See application file for complete search history.

(56) References Cited

U.S. PATENT DOCUMENTS

| | | | |
|---|---|---|---|
| 4,737,026 A | 4/1988 | Dalgoutte et al. | |
| 5,173,899 A * | 12/1992 | Ballance | H04B 10/272 370/503 |
| 5,285,305 A | 2/1994 | Cohen et al. | |
| 5,321,541 A | 6/1994 | Cohen | |
| 5,323,224 A | 6/1994 | Wada | |
| RE34,972 E * | 6/1995 | Horiguchi | G01M 11/39 356/73.1 |
| 5,548,432 A * | 8/1996 | Clarke | H04B 10/272 356/73.1 |
| 5,790,285 A | 8/1998 | Mock | |
| 5,966,206 A * | 10/1999 | Jander | H04B 10/071 356/73.1 |
| RE36,471 E | 12/1999 | Cohen | |
| 6,046,797 A | 4/2000 | Spencer et al. | |
| 6,075,628 A * | 6/2000 | Fisher | G01M 11/3118 398/1 |

(Continued)

FOREIGN PATENT DOCUMENTS

| | | |
|---|---|---|
| KR | 20120050960 A | 5/2012 |
| KR | 20130034519 A | 4/2013 |

OTHER PUBLICATIONS

International Search Report for PCT Application No. PCT/US2014/046247 dated Oct. 16, 2014.

*Primary Examiner* — Agustin Bello
(74) *Attorney, Agent, or Firm* — Ishimaru & Associates LLP

(57) ABSTRACT

A system and method of operation of an optical network communication system includes: an optical fiber; an optical link attached to the optical fiber; a data transmitter for sending a downstream data message at a downstream data wavelength in the optical link; an optical time domain reflectometry (OTDR) transmitter for sending a OTDR broadcast pattern continuously at an OTDR wavelength different from the downstream data wavelength in the optical link; a broadband photo detector coupled to the optical fiber; and an OTDR receiver for receiving an OTDR reflected response pattern on the broadband photo detector during an open time slot not used for receiving an upstream data message for indicating an optical fault and for calculating an error distance along the optical fiber based on the optical fault.

21 Claims, 7 Drawing Sheets

(56) References Cited

U.S. PATENT DOCUMENTS

| | | | |
|---|---|---|---|
| 6,285,806 B1 * | 9/2001 | Kersey | G01D 5/35383 385/12 |
| 6,519,026 B1 | 2/2003 | Holland | |
| 6,542,228 B1 * | 4/2003 | Hartog | G01M 11/3127 356/73.1 |
| 6,700,655 B2 * | 3/2004 | Uchiyama | G01M 11/319 356/73.1 |
| 7,030,971 B1 * | 4/2006 | Payton | G01L 1/242 356/35.5 |
| 7,268,863 B2 * | 9/2007 | Payton | G01M 11/3172 356/73.1 |
| 7,271,884 B2 * | 9/2007 | Payton | G01D 5/35383 356/73.1 |
| 7,274,441 B2 * | 9/2007 | Payton | G01D 5/35383 356/73.1 |
| 7,587,138 B2 | 9/2009 | Mc Greer et al. | |
| 7,630,641 B1 * | 12/2009 | Uhlhorn | H04B 10/071 398/28 |
| 7,872,738 B2 * | 1/2011 | Abbott | H04B 10/071 356/73.1 |
| 7,974,182 B2 * | 7/2011 | Healey | G01M 11/3172 370/215 |
| 8,406,620 B2 * | 3/2013 | Khermosh | H04B 10/071 398/13 |
| 8,515,278 B2 | 8/2013 | Cheng et al. | |
| 9,143,228 B2 * | 9/2015 | Sandstrom | H04B 10/071 |
| 9,154,224 B2 * | 10/2015 | Yin | H04L 43/50 |
| 2005/0174563 A1 | 8/2005 | Evans et al. | |
| 2006/0028636 A1 * | 2/2006 | Payton | G01D 5/35383 356/73.1 |
| 2006/0028637 A1 * | 2/2006 | Payton | G01D 5/35383 356/73.1 |
| 2006/0066839 A1 * | 3/2006 | Payton | G01L 1/242 356/73.1 |
| 2007/0171400 A1 * | 7/2007 | Payton | G01M 11/3172 356/73.1 |
| 2011/0013904 A1 * | 1/2011 | Khermosh | H04B 10/071 398/16 |
| 2012/0148241 A1 | 6/2012 | Piehler et al. | |
| 2012/0163800 A1 | 6/2012 | Urban | |
| 2013/0077975 A1 | 3/2013 | Dvir et al. | |
| 2013/0148958 A1 | 6/2013 | Liang et al. | |
| 2014/0071436 A1 * | 3/2014 | Cyr | G01N 21/21 356/73.1 |
| 2015/0016816 A1 * | 1/2015 | Piehler | H04B 10/071 398/10 |
| 2015/0077131 A1 * | 3/2015 | Incarbone | G01R 31/11 324/533 |

* cited by examiner

OPTICAL NETWORK COMMUNICATION SYSTEM WITH EMBEDDED OPTICAL TIME DOMAIN REFLECTOMETER AND METHOD OF OPERATION THEREOF

CROSS-REFERENCE TO RELATED APPLICATION(S)

This application claims the benefit of U.S. Provisional Patent Application Ser. No. 61/844,785 filed Jul. 10, 2013, and the subject matter thereof is incorporated herein by reference thereto.

TECHNICAL FIELD

The present invention relates generally to an optical network communication system, and more particularly to a system for operating a passive optical network with an embedded optical time domain reflectometer.

BACKGROUND ART

Optical network communication systems can be implemented using point-to-multipoint optical networks including a passive optical network (PON). Passive optical networks can transfer data using communication protocols such as Gigabit-enabled Passive optical network (GPON), Gigabit Ethernet Passive optical network (GE-PON), 10 Gigabit Ethernet Passive optical network (10 G EPON), 10 Gigabit Passive optical network (ITU-T Recommendation G.987, XG-PON), or other PON protocols.

The passive optical network is terminated at a single point, typically located in a telecommunications provider central office (CO), in an optical terminal and at multiple subscriber points, typically at the subscriber's residence, by an optical network unit (ONU). The optical terminal and the ONUs are coupled to an optical link for transmitting and receiving optical signals at different wavelengths. The optical terminal can include an optical line terminal (OLT) or other optical device.

The optical terminal transmits data messages at a downstream data wavelength and receives data message from the ONUs at an upstream data wavelength. The ONU transmits data message at the upstream data wavelength and receives data message from the optical terminal at the downstream data wavelength. The downstream data message broadcasts to all ONUs on the network; while upstream data message from each subscriber ONU can be assigned unique time slots according to a time division multiple access (TDMA) protocol.

To support data transmission between the optical terminal and ONUs, passive optical networks can use a single mode optical fiber for the optical link. The single mode optical fiber can carry optical information at different wavelengths without interfering with one another. In large passive optical networks, the optical link can include optical fibers from tens of meters to tens of kilometers in length.

Thus, a need still remains for an optical network communication system with the optical terminal configured for monitoring the performance and other optical properties of the optical link. In view of the growth in the optical network communication industry, world-wide, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any adequate solutions and, thus, solutions to these problems have long eluded those skilled in the art.

DISCLOSURE OF THE INVENTION

The present invention provides a method of operation of an optical network communication system including: sending a downstream data message at a downstream data wavelength in an optical link attached to an optical fiber; sending an optical time domain reflectometry (OTDR) broadcast pattern continuously at an OTDR wavelength different from the downstream data wavelength in the optical link, the downstream data message and the OTDR broadcast pattern sent simultaneously; receiving an OTDR reflected response pattern on a broadband photo detector during an open time slot not used for receiving an upstream data message for indicating an optical fault; and calculating an error distance along the optical fiber based on the optical fault.

The present invention provides an optical network communication system including: an optical fiber; an optical link attached to the optical fiber; a data transmitter for sending a downstream data message at a downstream data wavelength in the optical link; an OTDR transmitter for sending an OTDR broadcast pattern continuously at an OTDR wavelength different from the downstream data wavelength in the optical link, the OTDR broadcast pattern sent simultaneously with the downstream data message; a broadband photo detector coupled to the optical fiber; and an OTDR receiver for receiving an OTDR reflected response pattern on the broadband photo detector during an open time slot not used for receiving an upstream data message for indicating an optical fault and for calculating an error distance along the optical fiber based on the optical fault.

The present invention provides a bi-directional optical subassembly for terminating an optical network communication system including: a data transmitter for sending a downstream data message at a downstream data wavelength; an optical time domain reflectometry (OTDR) transmitter for sending an OTDR broadcast pattern continuously at an OTDR wavelength different from the downstream data wavelength in the OTDR broadcast pattern transmitted simultaneously with the downstream data message; a broadband photo detector; a data receiver for receiving an upstream data message on the broadband photo detector during an upstream time slot; and an OTDR receiver for receiving an OTDR reflected response pattern on the broadband photo detector during an open time slot not used for receiving the upstream data message and for calculating an error distance along the optical fiber based on the OTDR reflected response pattern.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
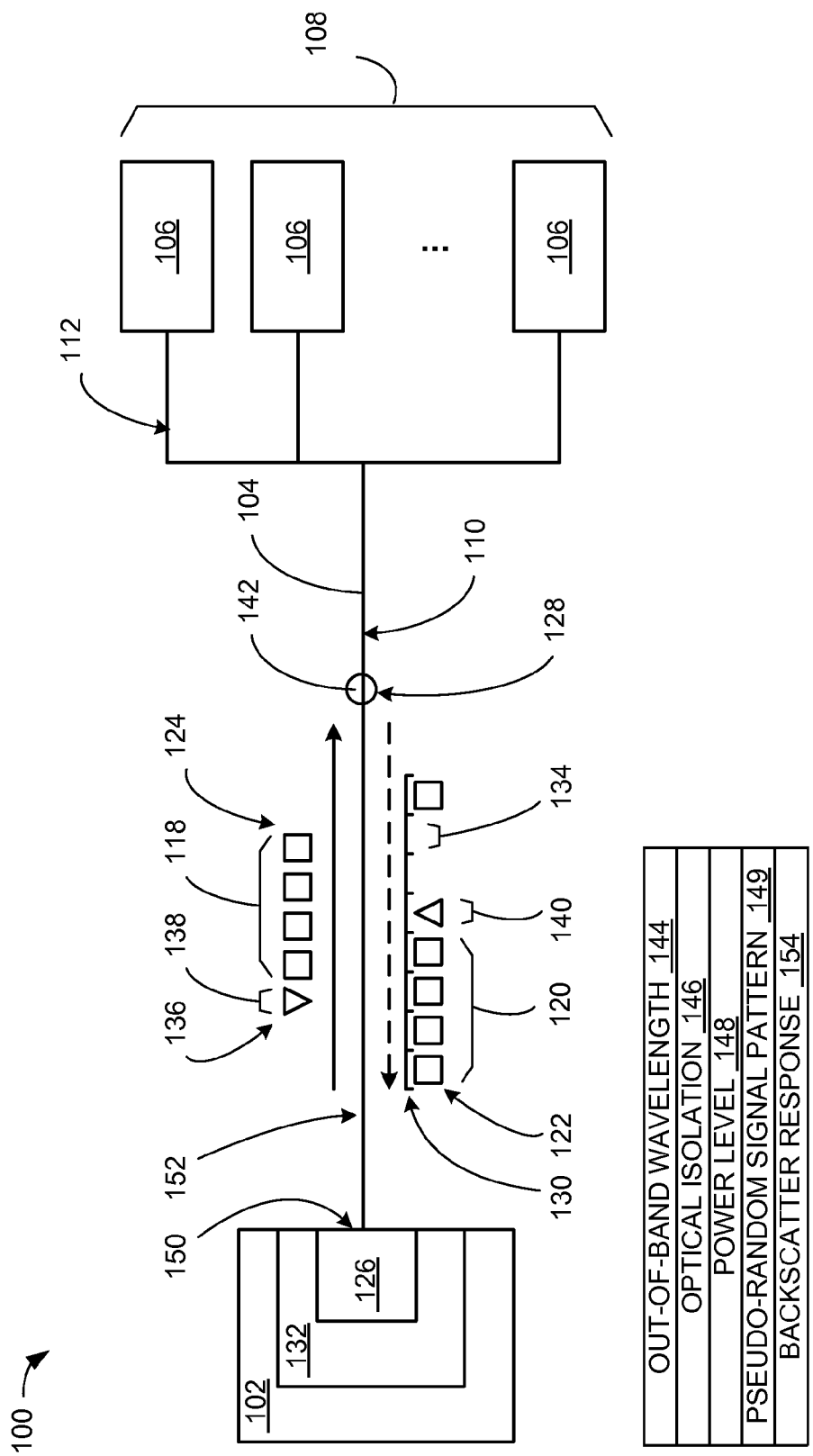
FIG. 1 is a block diagram of an optical network communication system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same numbers are used in all the drawing FIGs. to relate to the same or similar elements. Elements with the same number can represent similar elements in different embodiments. The embodiments have been numbered first embodiment, second embodiment, etc. as a matter of descriptive convenience and are not intended to have any other significance or provide limitations for the present invention.

The term "optical circuit" referred to herein can include optical pathways, optical waveguides, optical fibers, splitters, multiplexers, other optical components, or a combination thereof.

Referring now to FIG. 1, therein is shown an optical network communication system 100 in an embodiment of the present invention. The optical network communication system 100 is a system for distributing information to and from subscribers (not shown) on a network.

The optical network communication system 100 can be implemented in a variety of ways. For example, the optical network communication system 100 can be a passive optical network 108 (PON) forming a point-to-multipoint network between an optical terminal 102 and one or more optical network units 106. The optical terminal 102 is connected to all optical network units 106 via an optical link 104. Alternatively, the optical network communication system 100 can form a point-to-point link between optical terminal 102 and a single optical network unit 106.

The optical terminal 102 is a network device that couples a high speed network to the optical network units 106 for connecting to multiple local subscribers operating at lower network speeds. The optical terminal 102 broadcasts a downstream data message 118 to the optical network units 106 through the optical link 104. Each of the optical network units 106 can send an upstream data message 120 to the optical terminal 102 via the optical link 104.

The downstream data message 118 from the optical terminal 102 can be transmitted to all of the optical network units 106 simultaneously. Each of the optical network units 106 individually filters the downstream data message 118 from the optical terminal 102 to access the portion of the downstream data message 118 intended for each of the optical network units 106.

The downstream data message 118 and the upstream data message 120 are transmitted using different wavelengths to separate the signals and prevent interference. The downstream data message 118 is transmitted from the optical terminal 102 at a downstream data wavelength 124. The upstream data message 120 is transmitted from the optical network units 106 at an upstream data wavelength 122.

The upstream data message 120 can be transmitted to the optical terminal 102 using a time-division multiple access protocol where the upstream data message 120 from each of the optical network units 106 is partitioned into distinct data packets that are transmitted in specified upstream time slots 130 to insure data integrity. Each of the optical network units 106 can be allocated some of the upstream time slots 130 for sending the upstream data message 120 to the optical terminal 102. If none of the optical network units 106 have data to send during one of the upstream time slots 130, then the upstream time slots 130 can be vacant and unused. An open time slot 134 is one of the upstream time slots 130 that is unused.

The optical terminal 102 can provide functionalities including data transport, multiplexing, switching, management, error detection, supervision, or a combination thereof. The optical terminal 102 can include components such as hardware, software, memory, optical assemblies, optical transmitters, optical receivers, couplers, or a combination thereof.

The optical terminal 102 can include an optical transceiver module 132 having an optical subassembly 126. The optical transceiver module 132 is a network communication device for controlling the transmission and receiving of data traffic between the optical terminal 102 and the optical network units 106.

The optical transceiver module 132 can include a controller (not shown) and the optical subassembly 126. The controller is for managing the operation of the optical transceiver module 132 including controlling the optical subassembly 126.

The optical subassembly 126 is an optical communication device that can transmit and receive optical information via the optical link 104. The optical subassembly 126 can transmit and receive data, control information, diagnostic information, or a combination thereof. The optical subassembly 126 can include optical components including lasers, photo detectors, filters, wavelength division multiplexers (WDM), optical waveguides, beam splitters, optical traces, optical fibers, or a combination thereof. The optical components are elements that can manipulate optical signals.

The optical network units 106 are network devices that connect the optical terminal 102 to multiple local subscribers. The optical network units 106 are coupled to the optical terminal 102 in a point to multi-point network configuration.

The optical link 104 is an optical medium supporting the propagation of optical signals. The optical link 104 can include a fiber optic cable, a single mode optical fiber 110, a multi-mode optical fiber 112, optical waveguides, or a combination thereof. For example, the single mode optical fiber 110 can include a low-bend radius low-loss single mode optical fiber.

The optical link 104 can include an optical fault 142 in the optical link 104. The optical fault 142 is an optical irregularity in the optical link 104. The optical fault 142 can include a damaged area in an optical fiber, a sharp bend, a break, a manufacturing irregularity, a poorly configured optical fiber connector, or a combination thereof. The optical fault 142 can degrade the performance of the optical network.

For example, the optical fault 142 can be a kink in the optical fiber than can reduce the power of transmitted optical signals by causing a reflection or by allowing light to escape from the optical link 104. In another example, the optical fault 142 can be the end of the optical fiber.

The optical fault 142 can indicate an error distance 128. The error distance 128 is the distance to the optical fault 142. The optical terminal 102 can calculate the error distance 128 based on the optical fault 142.

The optical network communication system 100 can include an optical time domain reflectometry probe 150 (OTDR probe) to detect and locate the optical fault 142 in an optical fiber of the optical link 104. The OTDR probe 150 can be embedded within the optical subassembly 126.

The OTDR probe 150 can include OTDR transmitters, OTDR receivers, OTDR filters, or a combination thereof, for sending and receiving an OTDR signal pattern 152 for detecting the optical fault 142 in the optical link 104. For example, the OTDR probe 150 can be an optical time domain reflectometer.

The OTDR signal pattern 152 can carry OTDR information across the optical subassembly 126. The OTDR pattern signal 152 can include an OTDR broadcast pattern 138 or an OTDR reflected response pattern 140. The broadcast pattern 138 is the information sent into the optical link 104. The OTDR reflected response pattern 140 is information generated (i.e. the reflection within the optical link 104 in response to the OTDR broadcast pattern 138, such as the reflection within the optical link 104.

The OTDR probe 150 can send the OTDR broadcast pattern 138 at an OTDR wavelength 136 into the optical link 104 and measure the OTDR reflected response pattern 140 to detect the optical fault 142. The OTDR broadcast pattern 138 is a variable optical pattern sent from the optical subassembly 126 into the optical link 104. The OTDR wavelength 136 can be the wavelength of the broadcast pattern 138 and the OTDR reflected response pattern 140.

The OTDR reflected response pattern 140 is generated by the backscattering of the light of the OTDR broadcast pattern 138 as it propagates down the optical link 104 to the optical fault 142. The OTDR reflected response pattern 140 is generated at the OTDR wavelength 136. The OTDR reflected response pattern 140 can be processed via digital and/or analog algorithms responding to detected differences in the timing and intensity of the backscattered light to determine the location of the optical fault 142.

The backscatter light can be a response produced by Rayleigh scattering, Fresnel reflections, fiber faults, discontinuities, connections, or other effects. As a result, the effective power of the backscattered light is small compared to the upstream data message 120 returning from the optical network units 106.

The OTDR probe 150 operates in concert with passive optical networks that use time division multiple access (TDMA) protocols to multiplex the data transmitted over the optical link 104. The downstream data message 118 is transmitted to all of the optical network units 106 connected to the optical link 104 simultaneously.

The upstream network traffic on the optical link 104 is partitioned into the upstream time slots 130. The upstream data message 120 sent from the optical network units 106 can be partitioned and allocated to individual ones of the upstream time slots 130 for each of the optical network units 106. If none of the optical network units 106 needs to send data to the optical terminal 102, then allocate one of the upstream time slots 130 for that unit is unused. The open time slot 134 is one of the upstream time slots 130 that is unused.

The OTDR probe 150 can operate during the upstream time slots 130 that are unused where the optical network units 106 are not transmitting the upstream data message 120 over the optical link 104. For example, the optical link 104 can be available to send and receive OTDR information during the upstream time slots 130 that are allocated but unused by one of the optical network units 106. During the open time slot 134, the OTDR probe 150 can process the returning backscattered light of the OTDR reflected response pattern 140 to detect faults on the optical link 104.

The OTDR probe 150 can operate at an out-of-band wavelength 144 that is different from the downstream data wavelength 124 and the upstream data wavelength 122. Using the out-of-band wavelength 144 serves to separate and prevent interference between the data and OTDR information. An out-of band wavelength is defined as an optical wavelength outside of the wavelength ranges used to transmit the downstream data message 118 and the upstream data message 120. Although the wavelengths of the data and the OTDR information are provided, it is understood that the values are exemplary and can be changed according to need.

It has been discovered that using the out-of-band wavelength 144 can improve OTDR performance. Using the out-of-band wavelength 144 allows the use of optical filters to enable the low-loss injection and detection of the OTDR pattern.

Because the upstream data message 120 and the OTDR reflected response pattern 140 operate at different wavelengths, each can be discriminated and detected separately. For example, the upstream data message 120 at the upstream data wavelength 122 can be filtered and manipulated separately from the OTDR reflected response pattern 140 at the OTDR wavelength 136 based on the difference in wavelength. Using different wavelengths can increase an optical isolation 146. The optical isolation 146 is a measure of the amount of cross-talk between two signals.

The OTDR probe 150 can operate in a continuous mode where the broadcast pattern 138 is transmitted continuously at the out-of-band wavelength 144 in the optical link 104. The broadcast pattern 138 can be transmitted simultaneously with the downstream data message 118. The backscattering of the broadcast pattern 138 continuously generates the OTDR reflected response pattern 140.

Since the OTDR reflected response pattern 140 is small compared to the upstream data message 120, the upstream data message 120 can be received without significant interference from the OTDR reflected response pattern 140. The transmission of the upstream data message 120 can mask the OTDR reflected response pattern 140. The OTDR probe 150 can detect the OTDR reflected response pattern 140 during intervals when the upstream data message 120 is not being transmitted, such as when there is an unused one of the upstream time slots 130 for one of the optical network units 106.

By operating continuously, the OTDR probe 150 does not need advance information of when there are scheduled unused time slots available. Any of the upstream time slots 130 can be used when the upstream data message 120 is not being transmitted by the OTDR probe 150 to detect and identify the optical fault 142.

It has been discovered that using the out-of-band wavelength 144 for the OTDR probe 150 can simplify the operation of the OTDR probe 150. Using the out-of-band wavelength 144 allows the OTDR probe 150 to be operated continuously, eliminating the need for advance information about the availability of unused time slots. Any of the upstream time slots 130 not being used to transmit data can be used to detect the OTDR reflected response pattern 140. No additional computational overhead is required to track the unused time slots.

In another example, the OTDR probe 150 can reduce potential interference with the upstream data message 120 by using a low power approach to prevent interference from the OTDR reflected response pattern 140. By adjusting the transmitted power of the broadcast pattern 138, the OTDR probe 150 can control a power level 148 of the OTDR reflected response pattern 140 such that the power level 148 is low enough to prevent interference with the upstream data message 120. Interference can include situations where both signals are received by a single broadband photo sensor.

In another example, a low power approach can include using OTDR pattern generation and detection techniques such as Correlation-OTDR to use coded pulse codes and detection algorithms to detect the OTDR reflected response pattern 140. The Correlation-OTDR system can use a pseudo-random signal pattern 149 to generate a backscatter response 154 and use an autocorrelation function to detect faults. The backscatter response 154 is the reflected light backscattered from a fault.

In addition, other spread spectrum techniques based on the RF frequency distribution of the OTDR patterns can be used to manage and detect the OTDR reflected response pattern 140.

In an illustrative example, the OTDR probe 150 can be implemented as standalone test equipment that can be attached to the optical networks of service providers to detect faults. However, such testing may require a service interruption of the network in order to perform the testing. The optical network communication system 100 can embed the OTDR probe 150 in the optical subassembly 126 to allow real-time testing of the optical link 104 without the need to attach external test equipment.

In yet another illustrative example, the processor (not shown), such as a media access control processor (MAC), can be used to manage the upstream data message 120 of the optical network communication system 100 and provide scheduling information regarding the availability of unused ones of the upstream time slots 130 for the upstream data message 120. The scheduling information can be used to coordinate the transmission of the broadcast pattern 138 by only transmitting when there is an unused time slot to prevent interference between the OTDR reflected response pattern 140 and the upstream data message 120. However, this requires additional coordination between the MAC and the OTDR probe 150 and results in increased system overhead.

It has been discovered that incorporating the OTDR probe 150 with the optical subassembly 126 can increase performance and functionality by providing a real time optical fault detection capability in the optical terminal 102. Real-time optical fault detection can eliminate the need for service interruptions due to the use of external OTDR systems.

Figure 2:
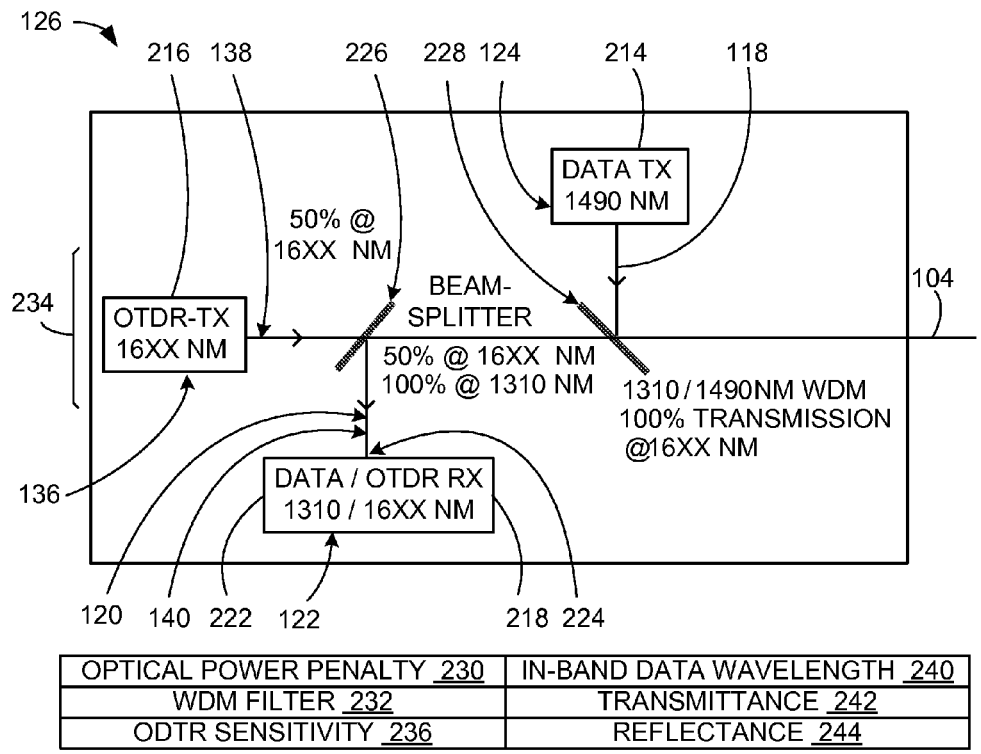
FIG. 2 is a schematic diagram of an optical subassembly of an optical terminal of the passive optical network.

Referring now to FIG. 2, therein is shown a schematic diagram of the optical subassembly 126 of the optical terminal 102 of FIG. 1 of the passive optical network 108 of FIG. 1. The optical subassembly 126 is a set of optical components that send and receive the data OTDR information to operate the optical network communication system 100 of FIG. 1

The optical network communication system 100 can include the optical subassembly 126. The optical subassembly 126 can send the downstream data message 118 to the optical network units 106 of FIG. 1 and receive the upstream data message 120 that returns. The optical subassembly 126 can send the OTDR broadcast pattern 138 to evaluate the quality of the optical link 104 and receive the OTDR reflected response pattern 140 to detect the presence and location of the optical fault 142 of FIG. 1.

The optical subassembly 126 can operate to send and receive data and OTDR information simultaneously. A data message, such as the downstream data message 118 or the upstream data message 120, can carry data across the optical subassembly 126. The OTDR signal pattern 152 of FIG. 1 can carry OTDR information across the optical subassembly 126.

The optical subassembly 126 can send the OTDR signal pattern 152 continuously without interfering with the data message. The optical subassembly 126 receives both the upstream data and the OTDR reflected response pattern 140 returning from the optical network units 106. The optical subassembly 126 can detect and process each signal separately.

The optical subassembly 126 includes a data transmitter 214 for generating the downstream data message 118. The data transmitter 214 is an optical communication device that can send the downstream data message 118 at the downstream data wavelength 124 to the optical link 104. The data transmitter 214 can include a laser diode, a distributed feedback laser, or a combination thereof. The data transmitter 214 can operate at the downstream data wavelength 124 of 1490 nanometers (nm).

The optical subassembly 126 can include an OTDR transmitter 216 for generating the broadcast pattern 138. The OTDR transmitter 216 is an optical communication device that can send the OTDR broadcast pattern 138 at the OTDR wavelength 136 of FIG. 1 to the optical link 104. The OTDR transmitter 216 can include a laser diode, a distributed feedback laser, or a combination thereof.

The OTDR transmitter 216 can operate at the out-of-band wavelength 144 of FIG. 1 with relation to the wavelengths of the downstream data message 118 and the upstream data message 120. The out-of-band wavelength 144 is a wavelength of light not within the range of wavelengths used for regular data transmission. For example, the OTDR transmitter 216 can operate with the OTDR wavelength 136 in the range from 1600 nm to 1699 nm. The wavelength range can be designated as 16xx nm.

The optical subassembly 126 can include a combination receiver 222 for receiving the both the upstream data message 120 and the OTDR reflected response pattern 140 simultaneously. The combination receiver 222 includes a photosensitive device for converting an optical signal to an electrical signal for processing.

The combination receiver 222 can include a broadband photo detector 224 that can detect optical signals across a range of wavelengths that includes the upstream data wavelength 122 and the OTDR wavelength 136. For example, the combination receiver 222 can be configured to detect transmissions at 1310 nm, and 16xx nm allowing the broadband photo detector 224 to receive upstream data and OTDR information. The broadband photo detector 224 can include a photodiode, an avalanche photodiode, a quantum dot photoconductor, or a combination thereof.

The optical subassembly 126 can include an OTDR receiver 218 for receiving the OTDR reflected response pattern 140. The OTDR receiver 218 is an optical communication device that can receive the OTDR reflected response pattern 140 from the optical link 104.

The optical subassembly 126 includes an OTDR filter 226, which is an optical element that can both reflect and allow transmission of optical signals based on wavelength. The OTDR filter 226 can be a wavelength sensitive beam splitter, a wavelength division multiplexer, or a combination thereof.

The OTDR filter 226 can be configured in a variety of ways. For example, the OTDR filter 226 can be configured to have a 50% transmittance and a 50% reflectance at a wavelength of 16xx nm and a 100% reflectance at a wavelength of 1310 nm.

The optical components can include properties such as a transmittance 242 and a reflectance 244. The transmittance 242 is the amount of light that can pass through one of the optical components. The reflectance 244 is the amount of light that is reflected from one of the optical components. Generally the sum of the transmittance 242 and the reflectance 244 is less than or equal to unity.

The OTDR filter 226 can be configured to allow 50% of the OTDR broadcast pattern 138 from the OTDR transmitter 216 to pass though the OTDR filter 226 to the optical link 104. The OTDR filter 226 can be configured to direct 100% of the upstream data message 120 to the combination receiver 222. The OTDR filter 226 can be configured to direct 50% of the OTDR reflected response pattern 140 returning from the optical link 104 to the combination receiver 222.

The optical subassembly 126 includes a combination filter 228, which is an optical element that can both reflect and allow transmission of optical signals based on wavelength. The OTDR filter 226 can be a wavelength sensitive beam splitter, a wavelength division multiplexer, or a combination thereof.

The combination filter 228 can be configured in a variety of ways. For example, the combination filter 228 can be configured to have a 100% reflectance at wavelengths of 1490 nm and 1310 nm, with a 100% transmittance at a wavelength of 16xx nm.

The combination filter 228 can be configured to reflect and direct 100% of the downstream data message 118 operating at 1490 nm into the optical link 104. The combination filter 228 can allow 100% of the upstream data message 120 at 1310 nm and 100% of the OTDR reflected response pattern 140 operating at 16xx nm from the optical link 104 to pass though the combination filter 228 to reflect off of the OTDR filter 226 and into the combination receiver 222.

The optical subassembly 126 can have a variety of configurations. For example, the optical subassembly 126 can have a triplexer configuration. The data message can implement a variety of communication protocols such as Gigabit-enabled Passive optical network (GPON), Gigabit Ethernet Passive optical network (GE-PON), or other optical communication protocols.

The configuration of the optical subassembly 126 influences the amount of an optical power penalty 230 experienced during the transmission of the OTDR broadcast pattern 138 and the reception of the OTDR reflected response pattern 140. The amount of the optical power penalty 230 is based on the amount of optical energy lost as the optical signal passes through the elements of the optical subassembly 126, particularly configuration of transmittance and reflectance of the WDM filters. The optical power penalty 230 for a WDM filter having x % transmittance and 100−x % reflectance can be calculated as follows:

$$\text{Optical power penalty } 230 = -10 \log(x/100) + -10 \log(1-x/100) \quad (1)$$

where x is the amount of transmittance at a given wavelength.

For example, if the OTDR wavelength 136 is different from the upstream data wavelength 122 and the downstream data wavelength 124, but still at a wavelength which can be detected by the broadband photo detector 224, then the use of a wavelength division multiplexing filter 232 (WDM filter) optimized for 50%/50% transmittance and reflectance can reduce the optical power penalty 230 to 10 log(0.5)+10 log (0.5)=6 dB.

It has been discovered that using the wavelength division multiplexing filter 232 having 50%/50% transmittance and reflectance with an out-of-band wavelength 144 can reduce the optical power penalty 230 compared to an in-band wavelength which would require a 90%/10% filter. The optical power penalty 230 for the 90%/10% wavelength division multiplexing filter 232 can be calculated as 10 log(0.9)+10 log(0.1)=10.5 dB.

The OTDR reflected response pattern 140 can have an optical path 234 different than the upstream data message 120 because of the difference in the out-of-band wavelength 144. Different optical filters have different wavelength properties can manipulate the optical signals differently.

However, when the OTDR reflected response pattern 140 and the upstream data message 120 are both received at the same one of the broadband photo detector 224 of the combination receiver 222, then both signals can contribute to the total signal detected by the broadband photo detector 224. In this case, the higher power of the upstream data message 120 can effectively mask the OTDR reflected response pattern 140. The OTDR reflected response pattern 140 can only be detected during an unused time slot when the upstream data message 120 is not being transmitted from the optical network units 106, enabling the OTDR detection of faults without the coordination with known vacant time slots of the optical network units 106.

The approach of using a separate one of the OTDR transmitter 216 operating out-of-band and utilizing vacant time slots in the upstream data message 120 to share the combination receiver 222 can improve an OTDR sensitivity 236 by at least 4.5 dB compared to other configuration. The OTDR sensitivity 236 is a measure of the detection level of the OTDR signal pattern 152.

The approach allows the full use of 100% of the laser modulation for the OTDR signal pattern 152. Higher power lasers can be used for increased sensitivity. Using the out-of-band wavelength 144 for the OTDR wavelength 136 decreases sensitivity to optical cross-talk between the OTDR transmitter 216 and the OTDR receiver 218.

It has been discovered that configuring the OTDR filter 226 for 50% transmittance and 50% reflectance at the OTDR wavelength 136 reduces the optical power penalty 230 and improves performance and sensitivity of the OTDR probe 150 of FIG. 1. By operating with the OTDR transmitter 216 at 50% transmittance and 50% reflectance at the OTDR wavelength 136, the optical power penalty 230 of the OTDR broadcast pattern 138 is reduced to 6 dB as compared with a 10.5 dB loss with a 10% transmittance and 90% reflectance configuration of the OTDR filter 226.

It has been discovered that configuring the OTDR transmitter 216 to operate at an OTDR out-of-band wavelength 144 that differentiates from an in-band data wavelength 240 of the data transmitter 214 increases functionality. By allowing the OTDR reflected response pattern 140 and the upstream data message 120 to be optically manipulated individually at the same time without interference, fault detection and data transmission can be processed individually to improve performance and functionality.

It has been discovered that operating the OTDR transmitter 216 continuously at an OTDR out-of-band wavelength 144 provides increased range of fault detection. The OTDR reflected response pattern 140 received during an unused time slot represents backscatter light from the OTDR broadcast pattern 138 sent before the detection of the unused time slot and provides the backscatter response 154 of FIG. 1 from a greater distance than provided by the OTDR broadcast pattern 138 sent and received only during the unused time slot.

It has been discovered that using the broadband photo detector 224 in the combination receiver 222 increases reliability and reduce manufacturing complexity by reducing the number of components required for operation. Because the broadband photo detector 224 can detect signals at the upstream data wavelength 122 and the OTDR wavelength 136, fewer components are required to receive data.

In addition, because the optical power level of the OTDR reflected response pattern 140 is smaller than the optical power level of the upstream data message 120, the combination receiver 222 can receive and discriminate the upstream data message 120 even when the OTDR reflected response pattern 140 is being detected simultaneously. The combination receiver 222 can resolve the OTDR reflected response pattern 140 during unused time slots when the upstream data message 120 is unavailable.

It has been discovered that operating the OTDR transmitter 216 continuously increases optical fault detection performance by transmitting continuously at a power level low enough to prevent interference and allow detection of the upstream data message 120. By operating the OTDR transmitter 216 in a continuous low power mode, faults in the optical link 104 can be detected during intervals when the upstream data message 120 is not being transmitted on the optical link 104 without interfering with the upstream data message 120.

It has been discovered that operating the OTDR transmitter 216 continuously provides increased reliability by allowing fault detection automatically in of the upstream time slots 130 of FIG. 1 that are not being used. Because the OTDR broadcast pattern 138 is continuously transmitted, the OTDR receiver 218 can receive the OTDR reflected response pattern 140 whenever it is not masked by the upstream data message 120.

It has been discovered that operating the OTDR transmitter 216 continuously at the OTDR wavelength 136 configured to be out-of-band provides increases the range of fault detection. The OTDR reflected response pattern 140 received during an unused one of the upstream time slots 130 represents backscatter light from the OTDR signal sent before the detection of the unused one of the upstream time slots 130 and provides a backscatter response from a greater distance than provided by an OTDR signal sent and received only during the unused time slot.

Figure 3:
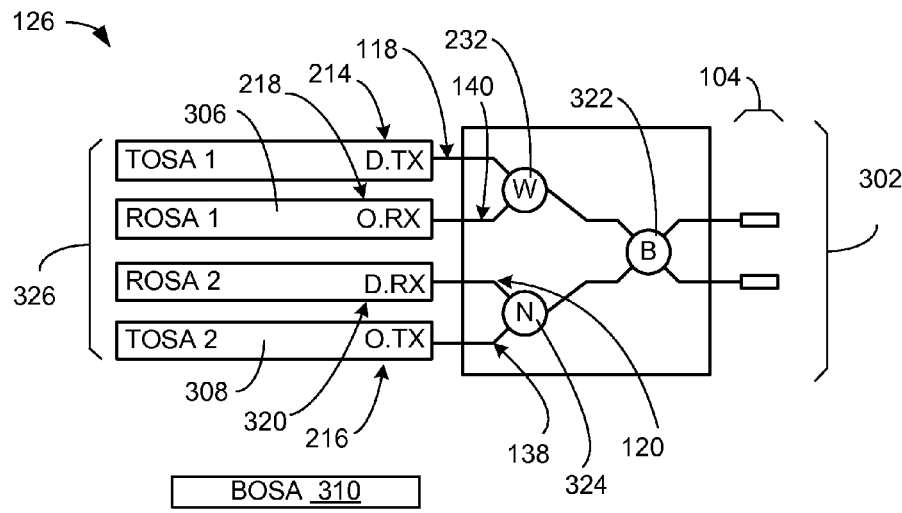
FIG. 3 is a schematic diagram of a planar lightwave circuit partially forming the optical subassembly in a second embodiment of the present invention.

Referring now to FIG. 3, therein is shown a schematic diagram of a planar lightwave circuit 302 forming the optical subassembly 126 in a second embodiment of the present invention. The planar lightwave circuit 302 (PLC) is an optical component that can implement a multi-element optical network of splitters, filters, WDM, waveguides, or a combination thereof. The planar lightwave circuit 302 can implement a variety of optical element configurations including a wavelength router, a 1×2 splitter, a 2×2 splitter, 1×32 splitter, or a combination thereof.

The optical subassembly 126 is shown represented by bulk optical elements including, transmitters, receivers, wavelength division multiplexers (WDM), filters, couplers, or a combination thereof. However, it is understood that the optical subassembly 126 can have other configurations. For example, the optical subassembly 126 can be implemented using the planar lightwave circuit 302 having components acting as the functional equivalent of the bulk optical elements. The planar lightwave circuit 302 is an optical component for forming optical circuits.

The optical subassembly 126 can be configured in a variety of ways. For example, the optical subassembly 126 can be configured with the planar lightwave circuit 302 and a combination of other active optical elements 326 including a bi-directional optical subassembly 310 (BOSA), a receiver optical subassembly 306 (ROSA), or a transmitter optical subassembly 308 (TOSA).

The active optical elements 326 are components that require power for operation. The active optical elements 326 include transmitters, receivers, or a combination thereof. The planar lightwave circuit 302 and the active optical elements 326 can be used in place of the bulk optical configuration shown in FIG. 2. Using the planar lightwave circuit 302 instead of discrete components can reduce the optical power penalty and simplify manufacture.

The bi-directional optical subassembly 310 is an optical component that can be configured to send optical signals at a given wavelength and to receive optical signals at the same or a different wavelength. The bi-directional optical subassembly 310 can include a laser diode, the broadband photo detector 224 of FIG. 2, optical fibers, beam splitters, WDM filters, or a combination thereof.

The optical subassembly 126 can have different configurations. For example, the transmitting and receiving functionality for the data and the OTDR information can be performed using the transmitter optical subassembly 308 and the receiver optical subassembly 306 instead of units such as the bi-directional optical subassembly 310.

The receiver optical subassembly 306 is an optical component that can be configured to receive optical signals at one or more wavelengths. The receiver optical subassembly 306 can include receivers, photo detectors, optical fibers, fiber array, or other optical components. The broadband photo detector 224 can include a photodiode, an avalanche photo diode (APD), a photocell, or a combination thereof.

The transmitter optical subassembly 308 is an optical component that can be configured to transmit optical signals at one or more wavelengths. The transmitter optical subassembly 308 can include transmitters, laser diodes, distributed feedback lasers (DFB), optical fibers, the fiber array, or a combination thereof. For example, the BOSA 310 can include the TOSA 308 and the ROSA 306.

The planar lightwave circuit 302 is an optical component that can be configured to implement an optical circuit. The planar lightwave circuit 302 can include optical splitters, optical waveguides, WDM, beam splitters, notch filters, combiners, or a combination thereof. The planar lightwave circuit 302 can be coupled to a combination of active components including the bi-directional optical subassembly 310, the receiver optical subassembly 306, or the transmitter optical subassembly 308.

The optical subassembly 126 can be configured to couple two of the transmitter optical subassembly 308 for transmitting data and couple two of the receiver optical subassembly 306 for receiving data and OTDR pattern to two instances of the optical link 104. The optical subassembly 126 can include the transmitter optical subassembly 308 having the data transmitter 214 and the OTDR receiver 218 both coupled to the planar lightwave circuit 302.

The data transmitter 214 can send the downstream data message 118 at the downstream data wavelength 124 of FIG. 1 to both instances of the optical link 104. The downstream data message 118 traverse the optical path 234 of FIG. 2 from the data transmitter 214 though the WDM filter 232, then through a 2×2 broadband splitter 322, and into both instances of the optical link 104.

The OTDR receiver 218 can receive the OTDR reflected response pattern 140 at the OTDR wavelength 136 of FIG. 1. For example, the OTDR wavelength 136 can be the out-of-band wavelength 144 of FIG. 1 with respect to the upstream data wavelength 122 of FIG. 1 and the downstream data wavelength 124. The OTDR reflected response pattern 140 traverse the optical path 234 from either of the instances of the optical link 104 through the 2×2 splitter, though the WDM filter 232, and into the OTDR receiver 218 of the bi-directional optical subassembly 310.

The WDM filter 232 can have different wavelength response configurations. For example, the WDM filter 232 can be configured to have 100% transmittance at the OTDR wavelength 136 and 100% transmittance at the downstream data wavelength 124 of FIG. 1.

The planar lightwave circuit 302 can include the 2×2 broadband splitter 322 having a 3 dB optical power loss in each direction. The 2×2 broadband splitter 322 splits optical power equally into each of two adjacent ports in each direction.

The optical subassembly 126 can include the receiver optical subassembly 306 having a data receiver 320 and the transmitter optical subassembly 308 having the OTDR transmitter 216 both coupled to the planar lightwave circuit 302. The data receiver 320 can receive the upstream data message 120 at the upstream data wavelength 122. The upstream data message 120 traverses the optical path 234 from either of the two instances of the optical link 104 through the 2×2 broadband splitter 322, through a WDM filter 324, and into the data receiver 320.

The OTDR transmitter 216 can send the OTDR broadcast pattern 138 at the OTDR wavelength 136 to both instances of the optical link 104. The OTDR broadcast pattern 138 traverses the optical path 234 from the OTDR transmitter 216 through the WDM filter 324, through the 2×2 broadband splitter 322, and into both instances of the optical link 104.

The planar lightwave circuit 302 may include the WDM filter 324 configured to have 100% transmittance at the OTDR wavelength 136 and 100% transmittance at the upstream data wavelength 122 of FIG. 1.

The WDM filter 324 is coupled to one port of the 2×2 broadband splitter 322 and further coupled to both instances of the optical link 104. WDM filters 232 and 324 can be configured for different wavelength responses. WDM filters 232 and 324 can alternately be configured as broadband power splitters with different splitting ratios.

It has been discovered that implementing the optical subassembly 126 using the planar lightwave circuit 302 increases performance and the optical isolation 146 of FIG. 1 as compared to bulk optical components. Channeling optical signals into the planar lightwave circuit 302 with optical fibers provides the optical isolation 146 greater than 55 dB between the optical signals, improving signal quality and reducing signal errors.

The use of planar lightwave circuit 302 configurations can improve the OTDR sensitivity 236 of FIG. 2 in an embedded configuration. Moving the central office splitting function into the optical terminal transceiver and the optical subassembly 126 of the optical terminal can improve the OTDR sensitivity 236 by more than 10 dB. By including the central office optical splitting function within the planar lightwave circuit 302, the effective OTDR optical power penalty 230 drops to zero dB.

Figure 4:
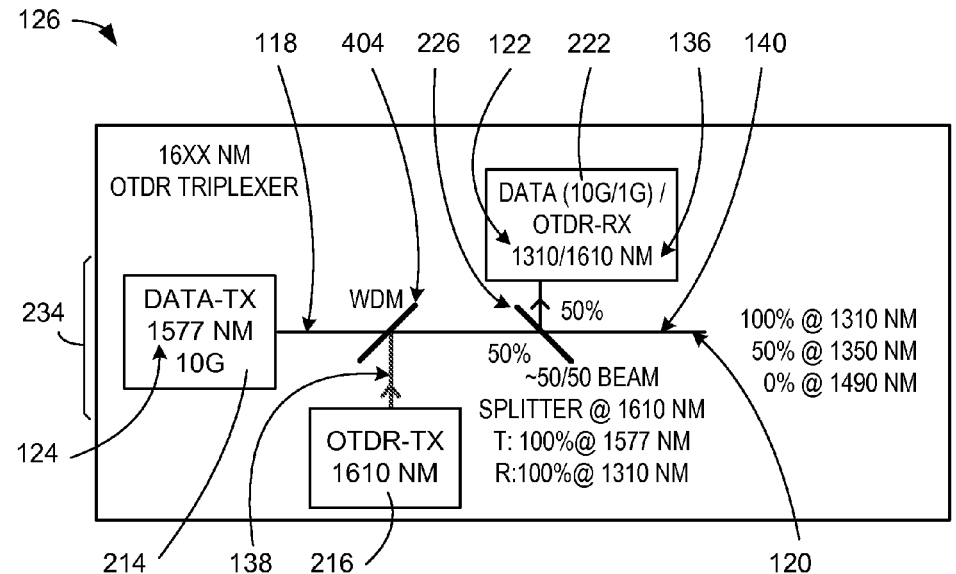
FIG. 4 is a schematic diagram of the optical subassembly in a third embodiment of the present invention.

Referring now to FIG. 4, therein is shown a schematic diagram of the optical subassembly 126 in a third embodiment of the present invention. The optical subassembly 126 can send and receive the data message and the OTDR signal pattern 152 of FIG. 1 to and from the optical link 104 of FIG. 1 for the passive optical network 108 of FIG. 1. The optical network communication system 100 of FIG. 1 includes similar elements as in the first embodiment of the optical network communication system 100.

The optical subassembly 126 includes the data transmitter 214 operating at the downstream data wavelength 124 of 1577 nm for sending the downstream data message 118 to the optical link 104 of FIG. 1. The downstream data message 118 traverses the optical path 234 that passes from the data transmitter 214, through a WDM filter 404, through the OTDR filter 226, and into the optical link 104. The optical subassembly 126 can be configured to deliver 100% of the downstream data message 118 from the data transmitter 214 to the optical link 104.

The transmitter filter 404 is an optical element for passing and reflecting light at different wavelengths. The transmitter filter 404 can be a beam splitter, a wavelength division multiplexer, or a combination thereof. The transmitter filter 404 can be configured in a variety of ways. For example, the transmitter filter 404 can be configured to have a 100% transmittance at the downstream data wavelength 124 of 1577 nm and a 100% reflectance at the OTDR wavelength 136 which in this example is 1610 nm (16XX=1610).

The OTDR filter 226 is an optical element for passing and reflecting light at different wavelengths. The OTDR filter 226 can be a beam splitter, wavelength division multiplexer, or a combination thereof.

The OTDR filter 226 can be configured in a variety of ways. For example, the OTDR filter 226 can be configured to have a 50% transmittance and 50% reflectance at the OTDR wavelength 136 of 1610 nm, 100% transmittance at the downstream data wavelength 124 of 1577 nm, and 100% reflectance at the upstream data wavelength 122 of 1310 nm.

The optical subassembly 126 includes the OTDR transmitter 216 operating at the OTDR wavelength 136 of 1610 nm for sending the OTDR broadcast pattern 138 to the optical link 104. The OTDR broadcast pattern 138 traverses the optical path 234 that passes from the OTDR transmitter 216, reflects off of the transmitter filter 404, through the OTDR filter 226, and into the optical link 104. The optical subassembly 126 can be configured to deliver 50% of the OTDR broadcast pattern 138 from the OTDR transmitter 216 to the optical link 104.

The optical subassembly 126 includes the combination receiver 222 that can receive the upstream data message 120 at the upstream data wavelength 122 of 1310 nm and the OTDR reflected response pattern 140 at the OTDR wavelength 136 of 1610 nm. The upstream data message 120 traverses the optical path 234 from the optical link 104 to the OTDR filter 226 and is reflected into the combination receiver 222. The optical subassembly 126 can be configured to deliver 100% of the upstream data message 120 to the combination receiver 222.

The OTDR reflected response pattern 140 traverses the optical path 234 from the optical link 104 to the OTDR filter 226 and is reflected into the combination receiver 222. The optical subassembly 126 can be configured to deliver 50% of the OTDR reflected response pattern 140 to the combination receiver 222.

It has been discovered that configuring the OTDR filter 226 for 50% transmittance and 50% reflectance at the OTDR wavelength 136 reduces the optical power penalty 230 of FIG. 2 and improves performance and sensitivity of the OTDR probe 150 of FIG. 1. By configuring the OTDR filter 226 to have a 50% transmittance and 50% reflectance at the OTDR wavelength 136, the optical power penalty 230 of the OTDR broadcast pattern 138 is reduced to 6 dB as compared with a 10.5 dB loss with a 10% transmittance and 90% reflectance configuration of other systems.

Figure 5:
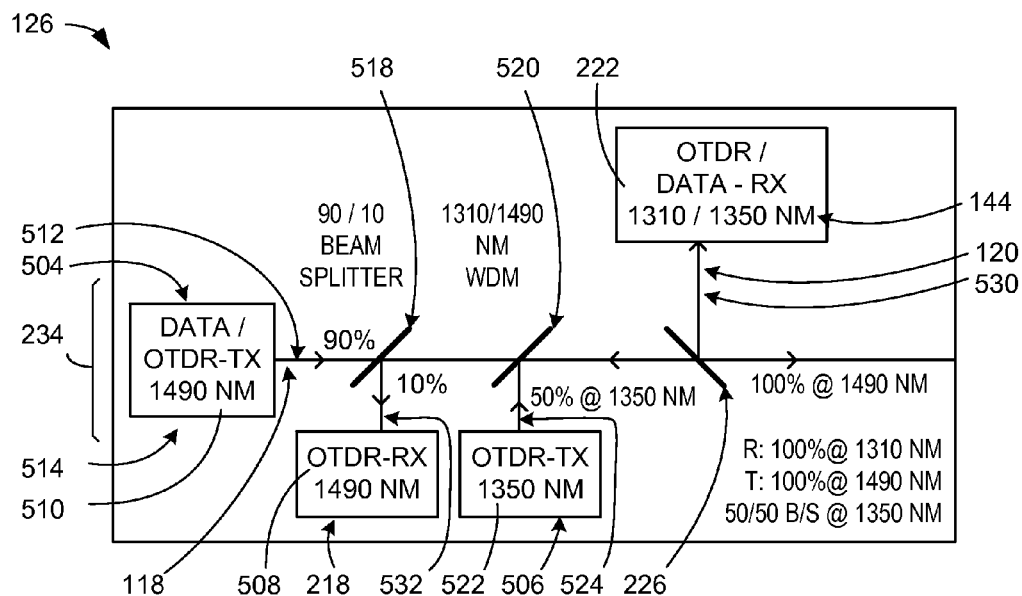
FIG. 5 is a schematic diagram of the optical subassembly in a fourth embodiment of the present invention.

Referring now to FIG. 5, therein is shown a schematic diagram of the optical subassembly 126 in a fourth embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

FIG. 5 utilizes two OTDRs systems operating simultaneously at OTDR wavelength 136 of 1490 nm (in-band), and another operating with an OTDR wavelength 136 of 1350 nm (out-of-band). Two OTDR wavelengths are useful for decreasing the OTDR data processing time and for minimizing the impact of coherent Rayleigh backscatter.

The optical subassembly 126 can be configured in a variety of ways. For example, the optical subassembly 126 can be configured with both an in-band OTDR probe 504 and an out-of-band OTDR probe 506. The in-band OTDR probe 504 includes an in-band OTDR receiver 508 and a combination transmitter 510 for sending an OTDR in-band broadcast pattern 512. The out-of-band OTDR probe 506 includes the out-of-band OTDR transmitter 522 and the combination receiver 222 for receiving an OTDR out-of-band response 530.

The optical subassembly 126 includes the combination transmitter 510 for sending the downstream data message 118 and the OTDR in-band broadcast 512 to the optical link 104. The combination transmitter 510 sends the downstream data message 118 at the downstream data wavelength 124 of FIG. 1 of 1490 nm and the OTDR in-band broadcast pattern 512 at the in-band OTDR wavelength 514 of 1490 nm.

The downstream data message 118 and the OTDR in-band broadcast pattern 512 traverse the optical path 234 that passes from the combination transmitter 510, through an in-band filter 518, though a data filter 520, through the OTDR filter 226, and into the optical link 104. The optical subassembly 126 can be configured to deliver 100% of the downstream data message 118 from the combination transmitter 510 to the optical link 104. The optical subassembly 126 can be configured to deliver 90% of the OTDR in-band broadcast 512 from the combination receiver 222 to the optical link 104.

The in-band filter 518 is an optical element for passing and reflecting light at different wavelengths. The in-band filter 518 can be a beam splitter, a wavelength division multiplexer, or a combination thereof. The in-band filter 518 can be configured in a variety of ways. For example, the in-band filter 518 can be configured to have a 90% transmittance and 10% reflectance at the downstream data wavelength 124 of 1490 nm and the in-band OTDR wavelength 514 of 1490 nm.

The data filter 520 is an optical element for passing and reflecting light at different wavelengths. The data filter 520 can be a beam splitter, a wavelength division multiplexer, or a combination thereof. The data filter 520 can be configured in a variety of ways. For example, the data filter 520 can be configured to have 100% transmittance at 1490 nm for both the downstream data wavelength 124 and the in-band OTDR wavelength 514. The data filter 520 can be configured to have a 100% reflectance at the upstream out-of-band wavelength 144 of 1350 nm.

The OTDR filter 226 is an optical element for passing and reflecting light at different wavelengths. The OTDR filter 226 can be a beam splitter, a wavelength division multiplexer, or a combination thereof. The OTDR filter 226 can be configured in a variety of ways. For example, the OTDR filter 226 can be configured to have a 100% transmittance and 0% reflectance at the upstream data wavelength 122 of FIG. 1 of 1310 nm, 50% transmittance and 50% reflectance at the OTDR out-of-band wavelength 144 at 1350 nm, and a 100% transmittance and 0% reflectance at the upstream in-band OTDR wavelength 514 of 1490 nm.

The optical subassembly 126 includes an out-of-band OTDR transmitter 522 for sending an OTDR out-of-band broadcast 524 at the OTDR out-of-band wavelength 144 of 1350 nm to the optical link 104. The OTDR out-of-band broadcast 524 traverses the optical path 234 that passes from the out-of-band OTDR transmitter 522, reflects off of the data filter 520, through the OTDR filter 226, and into the optical link 104. The optical subassembly 126 can be configured to deliver 50% of the OTDR out-of-band broadcast 524 from the out-of-band OTDR transmitter 522 to the optical link 104.

The optical subassembly 126 includes the in-band OTDR receiver 508 for receiving an OTDR in-band response 532 at the in-band OTDR wavelength 514 of 1490 nm from the optical link 104. The OTDR in-band response 532 traverses the optical path 234 that passes from the optical link 104, through the OTDR filter 226, though the data filter 520, reflects from the in-band filter 518, and into the OTDR receiver 218. The optical subassembly 126 can be configured to deliver 10% of the OTDR in-band response 532 from the optical link 104 to the OTDR receiver 218.

The optical subassembly 126 includes the combination receiver 222 for receiving the upstream data message 120 and the OTDR out-of-band response 530 from the optical link 104. The combination receiver 222 receives the upstream data message 120 at the upstream data wavelength 122 of 1310 nm and the OTDR out-of-band response 530 at the OTDR out-of-band wavelength 144 of 1350 nm.

The upstream data message 120 and the OTDR out-of-band response 530 each traverse the optical path 234 that passes from the optical link 104 and reflects off of the OTDR filter 226 and into the combination receiver 222. The optical subassembly 126 can be configured to deliver 100% of the upstream data message 120 and 50% of the OTDR in-band response 532 from the optical link 104 to the combination receiver 222.

The optical subassembly 126 can be configured to use two separate ones of the OTDR probe 150 of FIG. 1 to increase the detection of faults in the optical link 104. The in-band OTDR probe 504 can operate during unused time slots of the upstream data message 120 from optical network units 106 of FIG. 1 that have no data to send in that time slot. The in-band OTDR probe 504 can operate at 1490 nm and uses the in-band OTDR filter 226 configured with a transmittance of 90% and a reflectance of 10% at 1490 nm, resulting in the optical power penalty 230 of FIG. 2 of 10.5 dB. This can be calculated by equation 1 using the parameters of 90% and 10% with the optical power penalty 230=10 log(0.1)+10 log (0.9)=10.5 dB.

The optical subassembly 126 can be configured to use the out-of-band OTDR probe 506 with an OTDR out-of-band wavelength 144 of 1350 nm, where the data is send and received at 1490 nm and 1310 nm respectively. Using the OTDR out-of-band wavelength 144 allows the WDM filters in the system to be configured to provide a 50% transmittance and 50% reflectance at the OTDR out-of-band wavelength 144 without affecting data traffic.

The 50/50 WDM configuration for the OTDR out-of-band wavelength 144 can result in the optical power penalty 230 of 6 dB. This can be calculated using equation 1 using the given parameters with optical power penalty 230 giving 10 log (0.5)+10 log(0.5)=6 dB. The OTDR wavelength 136 can use other out-of-band wavelengths, such as 1340 nm for WDM1r compatibility.

It has been discovered that by configuring the out-of-band OTDR transmitter 522 to use the OTDR out-of-band wavelength 144 of 1350 nm reduces the optical power penalty 230 within the optical subassembly 126 and increases fault detection performance and sensitivity. By using the OTDR out-of-band wavelength 144 to allow separation from the upstream data message 120, the OTDR filter 226 can be configured to have a 50% transmittance and a 50% reflectance at the OTDR out-of-band wavelength 144 resulting in a reduction in the optical power penalty 230 of 6 dB at the OTDR out-of-band wavelength 144.

Figure 6:
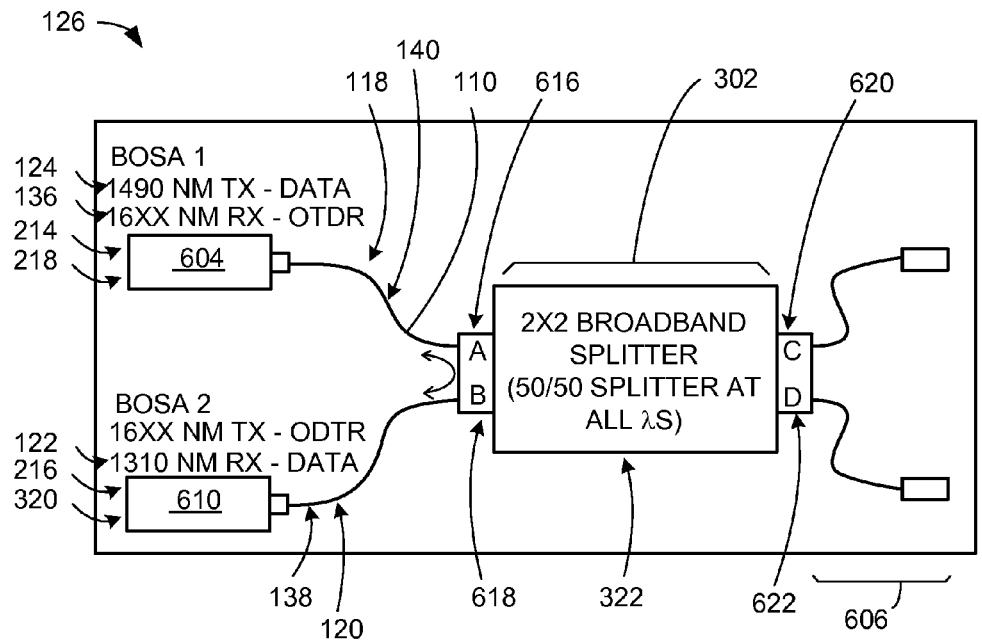
FIG. 6 is a schematic diagram of the optical subassembly in a fifth embodiment of the present invention.

Referring now to FIG. 6, therein is shown a schematic diagram of the optical subassembly 126 in a fifth embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

The optical subassembly 126 can be configured in a variety of ways. For example, the optical subassembly 126 can be configured with the planar lightwave circuit 302 and two of the bi-directional optical subassembly 310 of FIG. 3 (BOSA) coupled to a fiber array 606 connected to a fiber ferrule.

The planar lightwave circuit 302 is an optical component that can be configured to implement an optical circuit. The planar lightwave circuit 302 can include optical splitters, optical waveguides, WDM, beam splitters, notch filters, combiners, or a combination thereof.

The optical subassembly 126 includes a data BOSA 604 having the data transmitter 214 for sending the downstream data message 118 to the optical link 104 of FIG. 1 at the downstream data wavelength 124 of 1490 nm. The data BOSA 604 can include the OTDR receiver 218 for receiving the OTDR reflected response pattern 140 at the OTDR wavelength 136 of 16xx nm. The data transmitter 214 and the OTDR receiver 218 are optically coupled with the single mode optical fiber 110 to an A-port 616 of the planar lightwave circuit 302.

The optical subassembly 126 includes an OTDR BOSA 610 having the OTDR transmitter 216 for sending the OTDR broadcast pattern 138 to the optical link 104 at the OTDR wavelength 136 of 16xx nm. The OTDR BOSA 610 can include the data receiver 320 for receiving the upstream data message 120 from the optical link 104 at the upstream data wavelength 122 of 1310 nm. The OTDR transmitter 216 and the data receiver 320 are coupled with the single mode optical fiber 110 to a B-port 618 of the planar lightwave circuit 302. For example, the single mode optical fiber 110 can be a low-bend radius, low-loss single mode optical fiber.

The data BOSA 604 and the OTDR BOSA 610 that are connected to the planar lightwave circuit 302 have a port to port isolation of greater than 55 dB between the A-port 616 and the B-port 618 of the planar lightwave circuit 302.

The optical subassembly 126 includes the planar lightwave circuit 302 configured as the 2×2 broadband splitter 322 where the optical signal entering the A-port 616 or the B-port 618 of the planar lightwave circuit 302 is split evenly and distributed by a C-port 620 and a D-port 622 of the planar lightwave circuit 302. The planar lightwave circuit 302 can be configured to have 50% transmittance and 50% reflectance at all wavelengths.

The planar lightwave circuit 302 can have the C-port 620 and the D-port 622 coupled to the A-port 616 and the B-port 618. The C-port 620 and the D-port 622 can be attached to instances of the optical link 104.

The data BOSA 604 includes the OTDR receiver 218 while the OTDR BOSA 610 includes the OTDR transmitter 216. By separating the OTDR transmitter 216 and the OTDR receiver 218 and coupling each to the planar lightwave circuit 302 with optical fibers, the optical isolation 146 of FIG. 1 between the A-port 616 and the B-port 618 of the planar lightwave circuit 302 is greater than 55 dB.

In addition, by separating the components of the OTDR probe 150 of FIG. 1 in different units, the downstream data wavelength 124 and the upstream data wavelength 122 can be configured to support different network protocols. For example, optical network communication system 100 can be configured to Gigabit-enabled Passive optical network (GPON), Gigabit Ethernet Passive optical network (GEPON), 10 Gigabit Ethernet Passive optical network (10 G EPON), 10 Gigabit Passive optical network ITU-G.987 (XG-PON), or a combination thereof.

Because of the efficiency of the planar lightwave circuit 302, no light is wasted. In addition, if an additional 1×2 splitter is located near the transceiver, then the configuration can be included in a pluggable module and the optical power penalty 230 of FIG. 2 can be effectively reduced to zero. If a 1×2 splitter is not located near the transceiver, then the configuration acts as a two port transceiver with each port having a transmitter with 3 dB less link budget, but the optical power penalty 230 is 6 dB. If the configuration is limited to a single port, then there is a 3 dB penalty on the data.

It has been discovered that coupling the data BOSA 604 and the OTDR BOSA 610 to the planar lightwave circuit 302 increases sensitivity and optical performance based on the greater than 55 dB isolation between the A-port 616 and the B-port 618 of the planar lightwave circuit 302. Increased isolation reduces the level of errors detected in the optical signals and allows the detection of weaker signals.

Figure 7:
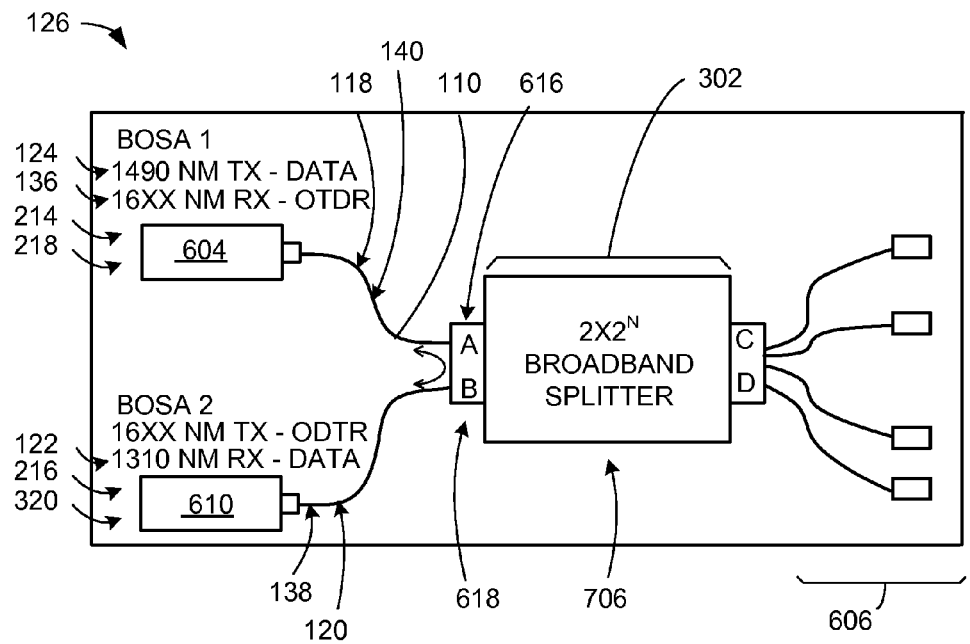
FIG. 7 is a schematic diagram of the optical subassembly in a sixth embodiment of the present invention.

Referring now to FIG. 7, therein is shown a schematic diagram of the optical subassembly 126 in a sixth embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

The optical subassembly 126 can be configured in a variety of ways. For example, the optical subassembly 126 can be configured with the planar lightwave circuit 302 and two of the bi-directional optical subassembly 310 of FIG. 3 (BOSA) coupled to the fiber array 606 connected to $2^N$ fiber ferrules.

The bi-directional optical subassembly 310 is an optical component that can be configured to send optical signals at a given wavelength and to receive optical signals at the same or a different wavelength. The bi-directional optical subassembly 310 can include a laser diode, the broadband photo detector 224 of FIG. 2, optical fibers, beam splitters, WDM filters, or a combination thereof.

The optical subassembly 126 includes the data BOSA 604 having the data transmitter 214 for sending the downstream data message 118 to the optical link 104 at the downstream data wavelength 124 of 1490 nm. The data BOSA 604 can include the OTDR receiver 218 for receiving the OTDR reflected response pattern 140 at the OTDR wavelength 136 of 16xx nm. The data transmitter 214 and the OTDR receiver 218 are optically coupled with the single mode optical fiber 110 to the A-port 616 of the planar lightwave circuit 302.

The optical subassembly 126 includes the OTDR BOSA 610 having the OTDR transmitter 216 for sending the OTDR broadcast pattern 138 to the optical link 104 at the OTDR wavelength 136 of 16xx nm. The OTDR BOSA 610 can include the data receiver 320 for receiving the upstream data message 120 from the optical link 104 at the upstream data wavelength 122 of 1310 nm.

The OTDR transmitter 216 and the data receiver 320 are coupled with the single mode optical fiber 110 to the B-port 618 of the planar lightwave circuit 302. The data BOSA 604 and the OTDR BOSA 610 connected to the planar lightwave circuit 302 have a port to port isolation of greater than 55 dB between the A-port 616 and the B-port 618 of the planar lightwave circuit 302. For example, the single mode optical fiber 110 can be a low-bend radius, low-loss single mode optical fiber.

The optical subassembly 126 includes the planar lightwave circuit 302 configured as a $2 \times 2^N$ broadband splitter 706 where the optical signal entering the A-port 616 or the B-port 618 of the planar lightwave circuit 302 is split evenly and distributed to the fiber array 606 coupled to $2^N$ instances of the optical link 104.

The data BOSA 604 includes the OTDR receiver 218 while the OTDR BOSA 610 includes the OTDR transmitter 216. By separating the OTDR transmitter 216 and the OTDR receiver 218 and coupling each to the planar lightwave circuit 302 with optical fibers, there is the optical isolation 146 of FIG. 1 between the A-port 616 and the B-port 618 of the planar lightwave circuit 302 of greater than 55 dB. In addition, by separating the components of the OTDR probe 150 in different units, the downstream data wavelength 124 and the upstream data wavelength 122 can be configured to support different protocols.

Because of the efficiency of the planar lightwave circuit 302, no light is wasted. In addition, if an additional 1×2 splitter is located near the transceiver, then the configuration can be included in a pluggable module and the optical power penalty 230 of FIG. 2 can be effectively reduced to zero.

It has been discovered that coupling the data BOSA 604 and the OTDR BOSA 610 to the planar lightwave circuit 302 increases sensitivity and optical performance based on the greater than 55 dB isolation between the A-port 616 of the planar lightwave circuit 302 and the B-port 618 of the planar lightwave circuit 302. Increased isolation reduces the level of errors detected in the optical signals and allows the detection of weaker signals.

Figure 8:
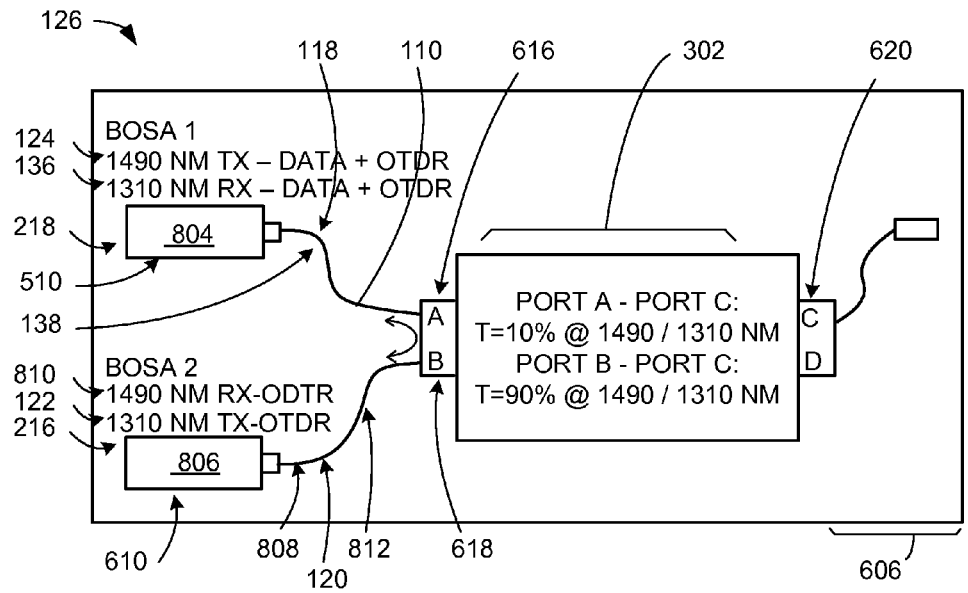
FIG. 8 is a schematic diagram of the optical subassembly in a seventh embodiment of the present invention.

Referring now to FIG. 8, therein is shown a schematic diagram of the optical subassembly 126 in a seventh embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

The optical subassembly 126 can be configured in a variety of ways. For example, the optical subassembly 126 can be configured with the 3 port planar lightwave circuit 302 and two of the bi-directional optical subassembly 310 of FIG. 3 (BOSA) coupled to the fiber array 606 connected to a fiber ferrule.

The bi-directional optical subassembly 310 is an optical component that can be configured to send optical signals at a given wavelength and to receive optical signals at the same or a different wavelength. The bi-directional optical subassembly 310 can include a laser diode, the broadband photo detector 224 of FIG. 2, optical fibers, beam splitters, WDM filters, or a combination thereof.

The optical subassembly 126 can be configured to have a dual OTDR probe. The first OTDR probe 150 of FIG. 1 can operate at 1490 nm and an OTDR secondary probe 806 can operate at 1310 nm.

The optical subassembly 126 includes a combination BOSA 804 having the combination transmitter 510 for sending the downstream data message 118 and the first OTDR signal to the optical link 104. The downstream data wavelength 124 and the first OTDR wavelength 136 are both 1490 nm.

The combination BOSA 804 includes the combination receiver 222 of FIG. 2 for receiving the upstream data message 120 and an OTDR secondary response 808 from the optical link 104. The OTDR secondary response 808 can have an OTDR secondary wavelength 810. The combination transmitter 510 and the combination receiver 222 are optically coupled with the single mode optical fiber 110 to the A-port 616 of the planar lightwave circuit 302. For example, the single mode optical fiber 110 can be a low-bend radius, low-loss single mode optical fiber.

The optical subassembly 126 includes the OTDR BOSA 610 having the OTDR transmitter 216 for sending an OTDR secondary broadcast 812 to the optical link 104 at the OTDR secondary wavelength 810 of 1310 nm. The OTDR BOSA 610 can include the OTDR receiver 218 for receiving the OTDR secondary response 808 at the first OTDR wavelength 136 of 1490 nm. The OTDR transmitter 216 and the OTDR receiver 218 are optically coupled with the single mode optical fiber 110 to the B-port 618 of the planar lightwave circuit 302. For example, the single mode optical fiber 110 can be a low-bend radius, low-loss single mode optical fiber.

The optical subassembly 126 includes the OTDR BOSA 610 having the OTDR transmitter 216 for sending the OTDR broadcast pattern 138 to the optical link 104 at the OTDR wavelength 136 of 16xx nm. The OTDR BOSA 610 can include the data receiver 320 of FIG. 3 for receiving the upstream data message 120 from the optical link 104 at the upstream data wavelength 122 of 1310 nm.

The OTDR transmitter 216 and the data receiver 320 are coupled with optical fiber to the B-port 618 of the planar lightwave circuit 302. The two BOSA connected to the planar lightwave circuit 302 have a port to port isolation of greater than 55 dB between the A-port 616 and the B-port 618 of the planar lightwave circuit 302.

The optical subassembly 126 includes the planar lightwave circuit 302 having three ports and configured as a 2×1 broadband 90/10 splitter coupling the A-port 616 of the planar lightwave circuit 302, the B-port 618 of the planar lightwave circuit 302 to the C-port 620 of the planar lightwave circuit 302. The planar lightwave circuit 302 can be configured to have the A-port 616 of the planar lightwave circuit 302 to the C-port 620 of the planar lightwave circuit 302 connection to have a transmittance of 10% at 1490 nm and 1310 nm.

The B-port 618 of the planar lightwave circuit 302 to the C-port 620 of the planar lightwave circuit 302 connection can have a transmittance of 90% at 1490 nm and 1310 nm. The C-port 620 of the planar lightwave circuit 302 can be coupled to a single instance of the optical link 104.

The data BOSA 604 includes the OTDR receiver 218 while the OTDR BOSA 610 includes the OTDR transmitter 216. By separating the OTDR transmitter 216 and the OTDR receiver 218 and coupling each to the planar lightwave circuit 302 with optical fibers, there is the optical isolation 146 of FIG. 1 between the A-port 616 and the B-port 618 of the planar lightwave circuit 302 of greater than 55 dB. The optical subassembly 126 configuration provides the optical power penalty 230 of FIG. 2 of 10.5 dB.

It has been discovered that coupling the data BOSA 604 and the OTDR BOSA 610 to the planar lightwave circuit 302 increases sensitivity and optical performance based on the greater than 55 dB isolation between the A-port 616 and the B-port 618 of the planar lightwave circuit 302. Increased isolation reduces the level of errors detected in the optical signals and allows the detection of weaker signals.

Figure 9:
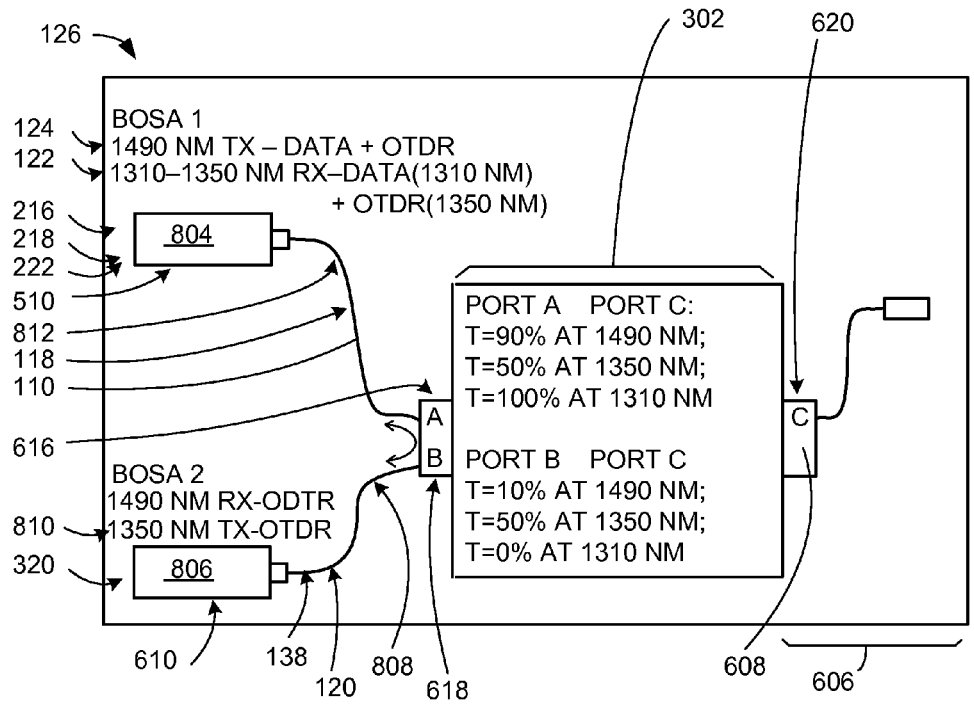
FIG. 9 is a schematic diagram of the optical subassembly in an eighth embodiment of the present invention.

Referring now to FIG. 9, therein is shown a schematic diagram of the optical subassembly 126 in an eighth embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

FIG. 9 utilizes two OTDRs systems operating simultaneously at OTDR wavelength 136 of FIG. 1 of 1490 nm (in-band), and another operating with an OTDR wavelength 136 of 1350 nm (out-of-band). Two OTDR wavelengths are useful for decreasing the OTDR data processing time and for minimizing the impact of coherent Rayleigh backscatter.

The optical subassembly 126 can be configured in a variety of ways. For example, the optical subassembly 126 can be configured with the planar lightwave circuit 302 and two of the bi-directional optical subassembly 310 of FIG. 3 (BOSA) coupled to the fiber array 606 connected to a fiber ferrule 608. The planar lightwave circuit 302 can have three-ports.

The bi-directional optical subassembly 310 is the optical component that can be configured to send optical signals at a given wavelength and to receive optical signals at the same or a different wavelength. The bi-directional optical subassembly 310 can include a laser diode, the broadband photo detector 224 of FIG. 2, optical fibers, beam splitters, WDM filters, or a combination thereof.

The optical subassembly 126 can be configured to have a dual OTDR probe. The first OTDR probe 150 of FIG. 1 can operate at first OTDR wavelength 136 of FIG. 1 of 1490 nm and the OTDR secondary probe 806 can operate at an OTDR secondary wavelength 810 of 1350 nm.

The optical subassembly 126 includes the combination BOSA 804 having the combination transmitter 510 for sending the downstream data message 118 and the first OTDR signal to the optical link 104. The downstream data wavelength 124 and the first OTDR wavelength 136 are both 1490 nm.

The combination BOSA 804 includes the combination receiver 222 for receiving the upstream data message 120 and the OTDR secondary response 808 from the optical link 104. The combination receiver 222 operates at the upstream data wavelength 122 of 1310 nm and the OTDR secondary wavelength 810 of 1350 nm. The combination transmitter 510 and the combination receiver 222 are optically coupled with the single mode optical fiber 110 to the A-port 616 of the planar lightwave circuit 302. For example, the single mode optical fiber 110 can be a low-bend radius, low-loss single mode optical fiber.

The optical subassembly 126 includes the OTDR BOSA 610 having the OTDR transmitter 216 for sending the OTDR secondary broadcast 812 to the optical link 104 at the OTDR secondary wavelength 810 of 1310 nm. The OTDR BOSA 610 can include the OTDR receiver 218 for receiving the OTDR secondary response 808 at the first OTDR wavelength 136 of 1490 nm. The OTDR transmitter 216 and the OTDR receiver 218 are optically coupled with optical fiber to the B-port 618 of the planar lightwave circuit 302.

The optical subassembly 126 includes the OTDR BOSA 610 of FIG. 6 having the OTDR transmitter 216 for sending the OTDR broadcast pattern 138 to the optical link 104 at the OTDR wavelength 136 of 16xx nm. The OTDR BOSA 610 can include the data receiver 320 for receiving the upstream data message 120 from the optical link 104 at the upstream data wavelength 122 of 1310 nm. The OTDR transmitter 216 and the data receiver 320 are coupled with the single mode optical fiber 110 to the B-port 618 of the planar lightwave circuit 302. For example, the single mode optical fiber 110 can be a low-bend radius, low-loss single mode optical fiber.

The combination BOSA 804 and the OTDR BOSA 610 connected to the planar lightwave circuit 302 have a port to port isolation of greater than 55 dB between the A-port 616 and the B-port 618 of the planar lightwave circuit 302.

The optical subassembly 126 includes the three port planar lightwave circuit 302 configured as a 2×1 splitter/WDM coupling the A-port 616 and the B-port 618 of the planar lightwave circuit 302 to the C-port 620 of the planar lightwave circuit 302. The planar lightwave circuit 302 acts as a wavelength division multiplexer filter.

The planar lightwave circuit 302 can be configured to have the A-port 616 of the planar lightwave circuit 302 to the C-port 620 of the planar lightwave circuit 302 connection to have a transmittance of 90% at 1490 nm, 50% at 1350 nm, and 100% at 1310 nm. The B-port 618 of the planar lightwave circuit 302 to the C-port 620 of the planar lightwave circuit 302 connection can be configured to have a transmittance of 10% at 1490 nm, 50% at 1350 nm, and 0% at 1310 nm. The C-port 620 of the planar lightwave circuit 302 is coupled to a single instance of the optical link 104.

The combination BOSA 804 includes the OTDR receiver 218 while the OTDR BOSA 610 includes the OTDR transmitter 216. By separating the OTDR transmitter 216 and the OTDR receiver 218 and coupling each to the planar lightwave circuit 302 with optical fibers, there is the optical isolation 146 of FIG. 1 between the A-port 616 and the B-port 618 of the planar lightwave circuit 302 of greater than 55 dB.

The optical subassembly 126 configuration provides the optical power penalty 230 of FIG. 2 of 10.5 dB. In addition, the optical subassembly 126 can include a receiver to receive the upstream data message 120 at 1310 nm.

It has been discovered that coupling the combination BOSA 804 and the OTDR BOSA 610 to the planar lightwave circuit 302 increases sensitivity and optical performance based on the greater than 55 dB isolation between the A-port 616 and the B-port 618 of the planar lightwave circuit 302. Increased isolation reduces the level of errors detected in the optical signals and allows the detection of weaker signals.

Figure 10:
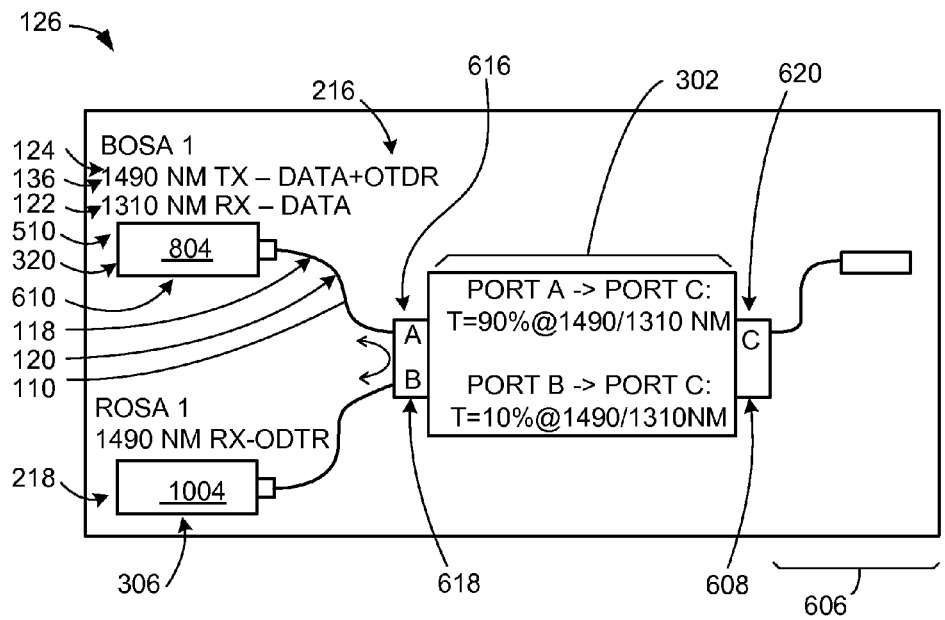
FIG. 10 is a schematic diagram of the optical subassembly in a ninth embodiment of the present invention.

Referring now to FIG. 10, therein is shown a schematic diagram of the optical subassembly 126 in a ninth embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

The optical subassembly 126 can be configured in a variety of ways. For example, the optical subassembly 126 can be configured with the bi-directional optical subassembly 310 of FIG. 3 and the receiver optical subassembly 306 (ROSA) connected to the planar lightwave circuit 302 coupled to the fiber array 606 and the fiber ferrule 608. The planar lightwave circuit 302 can have three-ports.

The bi-directional optical subassembly 310 is an optical component that can be configured to send optical signals at a given wavelength and to receive optical signals at the same or a different wavelength. The bi-directional optical subassembly 310 can include a laser diode, the broadband photo detector 224 of FIG. 2, optical fibers, beam splitters, WDM filters, or a combination thereof.

The receiver optical subassembly 306 is an optical component that can be configured to receive optical signals at a particular wavelength. The receiver optical subassembly 306 can include photo detectors, optical fibers, beam splitters, WDM filters, or a combination thereof.

The optical subassembly 126 includes the combination BOSA 804 having the combination transmitter 510 for sending the downstream data message 118 and the OTDR signal to the optical link 104. The downstream data wavelength 124 and the OTDR wavelength 136 are both 1490 nm. The combination BOSA 804 includes the data receiver 320 for receiving the upstream data message 120 from the optical link 104 at the upstream data wavelength 122 of 1310 nm. The combination transmitter 510 and the data receiver 320 are optically coupled with the single mode optical fiber 110 to the A-port 616 of the planar lightwave circuit 302. For example, the single mode optical fiber 110 can be a low-bend radius, low-loss single mode optical fiber.

The optical subassembly 126 includes an OTDR ROSA 1004 having the OTDR receiver 218 for receiving the OTDR signal pattern 152 at the OTDR wavelength 136 of 1490 nm. The OTDR receiver 218 is optically coupled with the single mode optical fiber 110 to the B-port 618 of the planar lightwave circuit 302. The combination BOSA 804 and the OTDR BOSA 610 connected to the planar lightwave circuit 302 have a port to port isolation of greater than 55 dB between the A-port 616 and the B-port 618 of the planar lightwave circuit 302. For example, the single mode optical fiber 110 can be a low-bend radius, low-loss single mode optical fiber.

The optical subassembly 126 includes the planar lightwave circuit 302 with three ports configured as a broadband 90/10 2×1 splitter coupling the A-port 616 and the B-port 618 of the planar lightwave circuit 302 to the C-port 620 of the planar lightwave circuit 302. The planar lightwave circuit 302 can be configured to have the A-port 616 to the C-port 620 connection to have a transmittance of 90% at 1490 nm and 1310 nm. The B-port 618 to the C-port 620 connection can be configured to have a transmittance of 10% at 1490 nm and 1310 nm. The C-port 620 of the planar lightwave circuit 302 is coupled to a single instance of the optical link 104.

The combination BOSA 804 includes the OTDR transmitter 216 while the OTDR ROSA 1004 includes the OTDR receiver 218. By separating the OTDR transmitter 216 and the OTDR receiver 218 and coupling each to the planar lightwave circuit 302 with optical fibers, there is the optical isolation 146 of FIG. 1 between the A-port 616 of the planar lightwave circuit 302 and the B-port 618 of the planar lightwave circuit 302 of greater than 55 dB.

It has been discovered that coupling the combination BOSA 804 and the OTDR ROSA 1004 to the planar lightwave circuit 302 increases sensitivity and optical performance based on the greater than 55 dB isolation between the A-port 616 and the B-port 618 of the planar lightwave circuit 302. Increased isolation reduces the level of errors detected in the optical signals and allows the detection of weaker signals.

Figure 11:
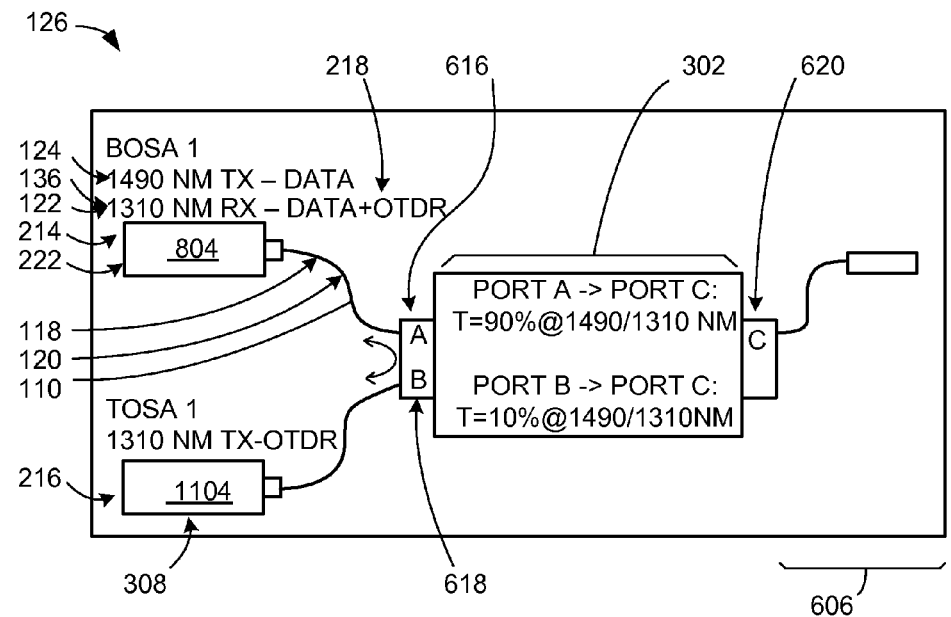
FIG. 11 is a schematic diagram of the optical subassembly in a tenth embodiment of the present invention.

Referring now to FIG. 11, therein is shown a schematic diagram of the optical subassembly 126 in a tenth embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

The optical subassembly 126 can be configured in a variety of ways. For example, the optical subassembly 126 can be configured with the bi-directional optical subassembly 310 of FIG. 3 and the transmitter optical subassembly 308 (TOSA) connected to the planar lightwave circuit 302 coupled to the fiber array 606 and a fiber ferrule. The planar lightwave circuit 302 can have three-ports.

The bi-directional optical subassembly 310 is the optical component that can be configured to send optical signals at a given wavelength and to receive optical signals at the same or a different wavelength. The bi-directional optical subassembly 310 can include a laser diode, the broadband photo detector 224 of FIG. 2, optical fibers, beam splitters, WDM filters, or a combination thereof.

The transmitter optical subassembly 308 is an optical component that can be configured to transmit optical signals at a particular wavelength. The transmitter optical subassembly 308 can include a laser diode, distributed feedback laser (DFB), optical fibers, beam splitters, WDM filters, or a combination thereof.

The optical subassembly 126 includes the combination BOSA 804 having the data transmitter 214 for sending the downstream data message 118 to the optical link 104 at the downstream data wavelength 124 of 1490 nm. The combination BOSA 804 includes the combination receiver 222 for receiving the upstream data message 120 and the OTDR reflected response pattern 140 of FIG. 1 from the optical link 104. The upstream data wavelength 122 and the OTDR wavelength 136 are both 1310 nm. The data transmitter 214 and the combination receiver 222 are optically coupled with the single mode optical fiber 110 to the A-port 616 of the planar lightwave circuit 302. For example, the single mode optical fiber 110 can be a low-bend radius, low-loss single mode optical fiber.

The optical subassembly 126 includes an OTDR TOSA 1104 having the OTDR transmitter 216 for sending the OTDR signal at the OTDR wavelength 136 of 1310 nm. The OTDR transmitter 216 is optically coupled with the single mode optical fiber 110 to the B-port 618 of the planar lightwave circuit 302.

The optical subassembly 126 includes the planar lightwave circuit 302 having three ports and configured as a broadband 90/10 2×1 splitter coupling the A-port 616 of the planar lightwave circuit 302, the B-port 618 of the planar lightwave circuit 302 to the C-port 620 of the planar lightwave circuit 302. The combination BOSA 804 and the OTDR TOSA 1104 are connected to the planar lightwave circuit 302 having a port to port isolation of greater than 55 dB between the A-port 616 and the B-port 618 of the planar lightwave circuit 302.

The planar lightwave circuit 302 can be configured to have the A-port 616 of the planar lightwave circuit 302 to the C-port 620 of the planar lightwave circuit 302 connection to have a transmittance of 90% at 1490 nm and 1310 nm. The B-port 618 of the planar lightwave circuit 302 to the C-port 620 of the planar lightwave circuit 302 connection can be configured to have a transmittance of 10% at 1490 nm and 1310 nm. The C-port 620 of the planar lightwave circuit 302 is coupled to a single instance of the optical link 104.

The combination BOSA 804 includes the OTDR receiver 218 while the OTDR TOSA 1104 includes the OTDR transmitter 216. By separating the OTDR receiver 218 and the OTDR transmitter 216 and coupling each to the planar lightwave circuit 302 with optical fibers, there is the optical isolation 146 of FIG. 1 between the A-port 616 and the B-port 618 of the planar lightwave circuit 302 of greater than 55 dB.

It has been discovered that coupling the combination BOSA 804 and the OTDR TOSA 1104 to the planar lightwave circuit 302 increases sensitivity and optical performance based on the greater than 55 dB isolation between the A-port 616 and the B-port 618 of the planar lightwave circuit 302. Increased isolation reduces the level of errors detected in the optical signals and allows the detection of weaker signals.

Figure 12:
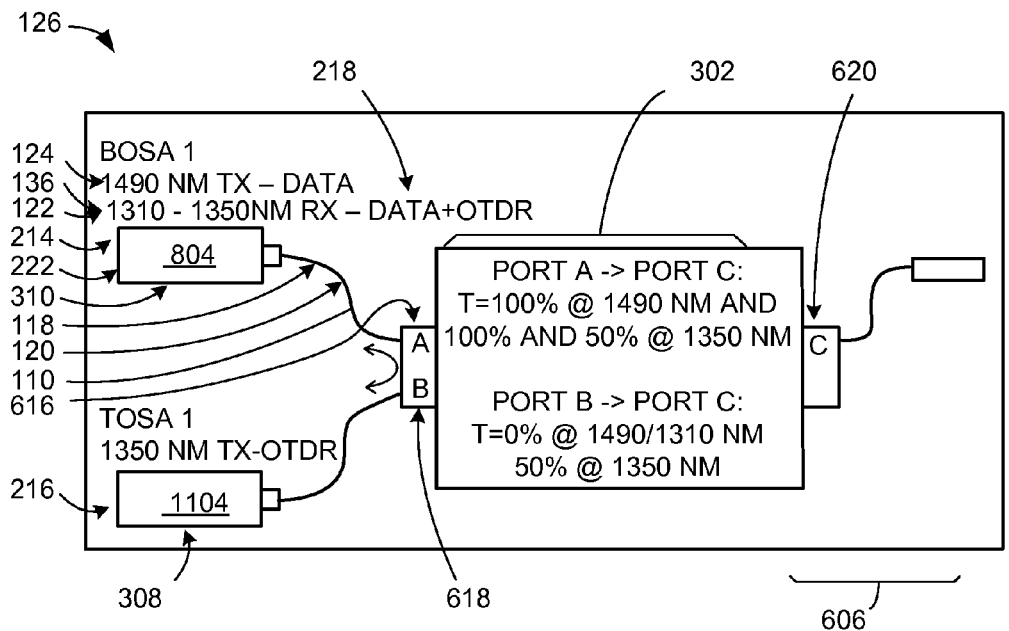
FIG. 12 is a schematic diagram of the optical subassembly in an eleventh embodiment of the present invention.

Referring now to FIG. 12, therein is shown a schematic diagram of the optical subassembly 126 in an eleventh embodiment of the present invention. The optical subassembly 126 can send and receive the data message and the OTDR signal pattern 152 of FIG. 1 to and from the optical link 104 of FIG. 1. The optical network communication system 100 of FIG. 1 includes similar elements as in the first embodiment of the optical network communication system 100.

The optical subassembly 126 can be configured in a variety of ways. For example, the optical subassembly 126 can be configured with the bi-directional optical subassembly 310 (BOSA) and a transmitter optical subassembly (TOSA) connected to the planar lightwave circuit 302 coupled to the fiber array 606 and the fiber ferrule. The planar lightwave circuit 302 can have three-ports.

The bi-directional optical subassembly 310 is the optical component that can be configured to send optical signals at a given wavelength and to receive optical signals at the same or a different wavelength. The bi-directional optical subassembly 310 can include a laser diode, the broadband photo detector 224 of FIG. 2, optical fibers, beam splitters, WDM filters, or a combination thereof.

The transmitter optical subassembly 308 is an optical component that can be configured to transmit optical signals at a particular wavelength. The transmitter optical subassembly 308 can include a laser diode, distributed feedback laser (DFB), optical fibers, beam splitters, WDM filters, or a combination thereof.

The optical subassembly 126 includes the combination BOSA 804 having the data transmitter 214 for sending the downstream data message 118 to the optical link 104 at the downstream data wavelength 124 of 1490 nm. The combination BOSA 804 includes the combination receiver 222 for receiving the upstream data message 120 and the OTDR reflected response pattern 140 of FIG. 1 from the optical link 104. The upstream data wavelength 122 is 1310 nm. The OTDR wavelength 136 is 1350 nm. The data transmitter 214 and the combination receiver 222 are optically coupled with the single mode optical fiber 110 to the A-port 616 of the planar lightwave circuit 302.

The optical subassembly 126 includes the OTDR TOSA 1104 having the OTDR transmitter 216 for sending the OTDR signal at the OTDR wavelength 136 of 1350 nm. The OTDR transmitter 216 is optically coupled with the single mode optical fiber 110 to the B-port 618 of the planar lightwave circuit 302. For example, the single mode optical fiber 110 can be a low-bend radius, low-loss single mode optical fiber.

The combination BOSA 804 and the OTDR TOSA 1104 are connected to the planar lightwave circuit 302 having a port to port isolation of greater than 55 dB between the A-port 616 and the B-port 618 of the planar lightwave circuit 302. Using the OTDR wavelength 136 of 1350 nm allows out-of-band operation and improves the optical power penalty 230 of FIG. 2 to 6 dB.

The optical subassembly 126 includes the planar lightwave circuit 302 having three ports and configured as a wavelength division multiplexer 2×1 splitter coupling the A-port 616 of the planar lightwave circuit 302, the B-port 618 of the planar lightwave circuit 302 to the C-port 620 of the planar lightwave circuit 302.

The planar lightwave circuit 302 can be configured to have the A-port 616 of the planar lightwave circuit 302 to the C-port 620 of the planar lightwave circuit 302 connection to have a transmittance of 100% at 1490 nm and 1310 nm with a transmittance of 50% at 1350 nm. The B-port 618 of the planar lightwave circuit 302 to the C-port 620 of the planar lightwave circuit 302 connection can be configured to have a transmittance of 0% at 1490 nm and 1310 nm with a transmittance of 50% at 1350 nm. The C-port 620 of the planar lightwave circuit 302 is coupled to a single instance of the optical link 104.

The combination BOSA 804 includes the OTDR receiver 218 of FIG. 2 while the OTDR TOSA 1104 includes the OTDR transmitter 216. By separating the OTDR receiver 218 and the OTDR transmitter 216 and coupling each to the planar lightwave circuit 302 with optical fibers, there is the optical isolation 146 of FIG. 1 between the A-port 616 and the B-port 618 of the planar lightwave circuit 302 of greater than 55 dB.

It has been discovered that coupling the combination BOSA 804 and the OTDR TOSA 1104 to the planar lightwave circuit 302 increases sensitivity and optical performance based on the greater than 55 dB isolation between the A-port 616 and the B-port 618 of the planar lightwave circuit 302. Increased isolation reduces the level of errors detected in the optical signals and allows the detection of weaker signals.

Figure 13:
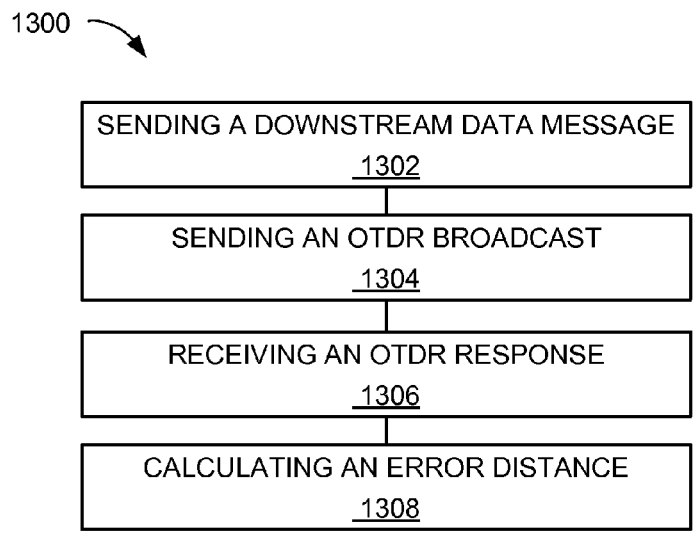
FIG. 13 is a flow chart of a method of operation of an optical network communication system in a further embodiment of the present invention.

Referring now to FIG. 13, therein is shown a flow chart of a method 1300 of operation of the optical network communication system in a further embodiment of the present invention. The method 1300 includes: sending a downstream data message at a downstream data wavelength in an optical link attached to an optical fiber in a block 1302; sending an optical time domain reflectometry (OTDR) broadcast continuously at an OTDR wavelength different from the downstream data wavelength in the optical link, the downstream data message and the OTDR broadcast pattern sent simultaneously in a block 1304; receiving an OTDR reflected response pattern on a broadband photo detector during an open time slot not used for receiving an upstream data message for indicating an optical fault in a block 1306; and calculating an error distance along the optical fiber based on the optical fault in a block 1308.

The resulting method, process, apparatus, device, product, and/or system is straightforward, cost-effective, uncomplicated, highly versatile and effective, can be surprisingly and unobviously implemented by adapting known technologies, and are thus readily suited for efficiently and economically operating optical network communication systems and fully compatible with conventional methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of an optical network communication system comprising:
    sending a downstream data message at a downstream data wavelength in an optical link attached to an optical fiber;
    sending an optical time domain reflectometry (OTDR) broadcast pattern continuously at an OTDR wavelength different from the downstream data wavelength in the optical link, the downstream data message and the OTDR broadcast pattern sent simultaneously;
    splitting an OTDR reflected response pattern with an optical element configured to split optical power equally for the OTDR wavelength to reduce an optical power penalty in a planar lightwave circuit;
    receiving the OTDR reflected response pattern on a broadband photo detector during an open time slot not used for receiving an upstream data message for indicating an optical fault; and
    calculating an error distance along the optical fiber based on the optical fault.

2. The method as claimed in claim 1 wherein receiving the OTDR reflected response pattern includes receiving the OTDR reflected response pattern with the broadband photo detector configured to detect an upstream data wavelength and the OTDR wavelength.

3. The method as claimed in claim 1 wherein sending the OTDR broadcast pattern includes sending the OTDR broadcast pattern independent of the downstream data message.

4. The method as claimed in claim 1 wherein sending the OTDR broadcast pattern includes sending the OTDR broadcast pattern at a power level lower than the power level of the downstream data message for reducing interference with the downstream data message.

5. The method as claimed in claim 1 wherein:
    sending the OTDR broadcast pattern includes sending the OTDR broadcast pattern having a pseudo-random signal pattern; and
    receiving the OTDR reflected response pattern includes detecting the OTDR reflected response pattern with autocorrelation.

6. A method of operation of an optical network communication system comprising:
    sending a downstream data message at a downstream data wavelength in an optical link attached to an optical fiber;
    sending an optical time domain reflectometry broadcast pattern continuously at an OTDR wavelength different from the downstream data wavelength in the optical link, the downstream data message and the OTDR broadcast pattern sent simultaneously;
    splitting an OTDR reflected response pattern with a 2×2 broadband splitter configured to split optical power equally for the OTDR wavelength and an upstream data wavelength to reduce an optical power penalty in a planar lightwave circuit;
    receiving an upstream data message on a broadband photo detector during an upstream time slot;
    receiving the OTDR reflected response pattern on the broadband photo detector during an open time slot not used for receiving the upstream data message for indicating an optical fault; and
    calculating an error distance along the optical fiber based on the optical fault.

7. The method as claimed in claim 6 wherein receiving the OTDR reflected response pattern includes receiving the OTDR reflected response pattern with the broadband photo detector configured to detect the downstream data wavelength and the OTDR wavelength.

8. The method as claimed in claim 6 wherein sending the OTDR broadcast pattern includes sending the OTDR broadcast pattern independent of the downstream data message.

9. The method as claimed in claim 6 wherein sending the OTDR broadcast pattern includes sending the OTDR broadcast pattern at a power level lower than the power level of the downstream data message for reducing interference with the downstream data message.

10. The method as claimed in claim 6 wherein:
    sending the OTDR broadcast pattern includes sending the OTDR broadcast pattern having a pseudo-random signal pattern; and
    receiving the OTDR reflected response pattern includes detecting the OTDR reflected response pattern with autocorrelation.

11. An optical network communication system comprising:
    an optical fiber coupled to a planar lightwave circuit;
    an optical link attached to the optical fiber;
    a data transmitter for sending a downstream data message at a downstream data wavelength in the optical link;
    an optical time domain reflectometry (OTDR) transmitter for sending an optical time domain reflectometry broadcast pattern continuously at an OTDR wavelength different from the downstream data wavelength in the optical link, the OTDR broadcast pattern sent simultaneously with the downstream data message;
    an optical element, coupled to the data transmitter and the OTDR transmitter, configured to split optical power equally for the OTDR wavelength to reduce an optical power penalty in the planar lightwave circuit;
    a broadband photo detector coupled to the optical element and the optical fiber; and
    an optical time domain reflectometry receiver for receiving an OTDR reflected response pattern on the broadband photo detector during an open time slot not used for receiving an upstream data message for indicating an optical fault optical terminal and for calculating an error distance along the optical fiber based on the optical fault.

12. The system as claimed in claim 11 wherein the broadband photo detector is configured to detect the downstream data wavelength and the OTDR wavelength.

13. The system as claimed in claim 11 wherein the OTDR broadcast pattern is sent independent of the downstream data message.

14. The system as claimed in claim 11 wherein the OTDR broadcast pattern is sent at a power level lower than the power level of the downstream data message for reducing interference with the downstream data message.

15. The system as claimed in claim 11 wherein the OTDR broadcast pattern includes a pseudo-random signal pattern and the OTDR reflected response pattern is detected with autocorrelation.

16. The system as claimed in claim 11 further comprising a data receiver configured to receive the upstream data message on the broadband photo detector during an upstream time slot.

17. The system as claimed in claim 16 wherein the broadband photo detector is configured to detect the downstream data wavelength and the OTDR wavelength.

18. The system as claimed in claim 16 wherein the OTDR broadcast pattern is sent independent of the downstream data message.

19. The system as claimed in claim 16 wherein the OTDR broadcast pattern is at a power level lower than the power level of the downstream data message for reducing interference with the downstream data message.

20. The system as claimed in claim 16 wherein the OTDR broadcast pattern includes a pseudo-random signal pattern and the OTDR reflected response pattern is detected with autocorrelation.

21. A bi-directional optical subassembly for terminating an optical network communication system comprising:

a data transmitter for sending a downstream data message at a downstream data wavelength;

an optical time domain reflectometry (OTDR) transmitter for sending an OTDR broadcast pattern continuously at an OTDR wavelength different from the downstream data wavelength, the OTDR broadcast pattern transmitted simultaneously with the downstream data message;

an optical element, coupled to the data transmitter and the OTDR transmitter, configured to split optical power equally for the OTDR wavelength to reduce an optical power penalty in a planar lightwave circuit;

a broadband photo detector;

a data receiver for receiving an upstream data message on the broadband photo detector during an upstream time slot; and an OTDR receiver for receiving an OTDR reflected response pattern on the broadband photo detector during an open time slot not used for receiving the upstream data message and for calculating an error distance along the optical fiber based on the OTDR reflected response pattern.

* * * * *